United States Patent [19]

Inaba et al.

[11] Patent Number: 5,125,149
[45] Date of Patent: Jun. 30, 1992

[54] METHOD OF ACCESSING AND ASSEMBLING PARTS IN AN ASSEMBLY APPARATUS INCORPORATING MOBILE ROBOTS

[75] Inventors: Ryohei Inaba; Sachio Umetsu; Toshihiko Miura, all of Kawasaki; Yusaku Azuma, Yokohama, all of Japan

[73] Assignee: Canon Kabushiki Kaisha, Tokyo, Japan

[21] Appl. No.: 514,415

[22] Filed: Apr. 25, 1990

[30] Foreign Application Priority Data

| Apr. 28, 1989 [JP] | Japan | 1-107745 |
| Apr. 28, 1989 [JP] | Japan | 1-107746 |
| Apr. 28, 1989 [JP] | Japan | 1-107747 |
| Apr. 28, 1989 [JP] | Japan | 1-107748 |

[51] Int. Cl.$^5$ .................................... B23P 21/00
[52] U.S. Cl. ............................ 29/430; 29/429; 29/720; 29/771; 29/787; 198/341
[58] Field of Search .............. 29/783, 712, 771, 784, 29/787, 791, 795, 799, 822, 823, 824, 430, 431, 429, 720, 721; 198/341, 346.1; 414/222, 225; 901/1, 7, 8

[56] References Cited

U.S. PATENT DOCUMENTS

| 3,796,327 | 3/1974 | Meyer et al. | 29/712 |
| 3,878,596 | 4/1975 | Iwai . | |
| 3,958,682 | 5/1976 | Martin | 198/341 |
| 4,144,960 | 3/1979 | Scourtes | 198/346.1 |
| 4,561,060 | 12/1985 | Hemond | 198/341 |
| 4,669,168 | 6/1987 | Tamura et al. | 29/823 |
| 4,673,075 | 7/1987 | Ueyama et al. | 29/791 |
| 4,674,181 | 6/1987 | Hamada et al. | 29/712 |
| 4,715,772 | 12/1987 | Karayama | 29/720 |
| 4,722,653 | 2/1988 | Williams et al. | 29/791 |
| 4,740,133 | 4/1988 | Kawano | 901/8 |
| 4,774,757 | 10/1988 | Sakamoto et al. | 29/712 |
| 4,783,904 | 11/1988 | Kimura | 29/783 |
| 4,789,417 | 12/1988 | Komatsu et al. | 29/791 |
| 4,799,581 | 1/1989 | Fujii | 29/430 |
| 4,843,708 | 7/1989 | Yokoi et al. | 29/720 |
| 4,844,680 | 7/1989 | Kawata et al. . | |
| 4,856,701 | 9/1989 | Pöckl | 29/771 |
| 4,884,330 | 12/1989 | Sticht | 29/783 |
| 4,926,544 | 5/1990 | Koyanagi et al. | 29/771 |
| 4,932,828 | 6/1990 | Katae et al. | 414/286 |

FOREIGN PATENT DOCUMENTS

| 56-13572 | 3/1981 | Japan . | |
| 58-34251 | 7/1983 | Japan . | |
| 59-14582 | 1/1984 | Japan . | |
| 60-118445 | 6/1985 | Japan . | |
| 63-33972 | 7/1988 | Japan . | |
| 295135 | 12/1988 | Japan | 29/784 |

Primary Examiner—P. W. Echols
Assistant Examiner—David P. Bryant
Attorney, Agent, or Firm—Fitzpatrick, Cella, Harper & Scinto

[57] ABSTRACT

An assembly (machining) apparatus and method for performing assembly or machining of an article. A first article supply device including a plurality of supply devices for supplying articles and a first robot for picking up the articles from the first article supply device to perform the assembly or machining are paired as an assembly unit, and a plurality of the assembly units are aligned. The apparatus also includes a buffer device for adjusting a difference in article assembly or machining time between the plurality of assembly units.

2 Claims, 24 Drawing Sheets

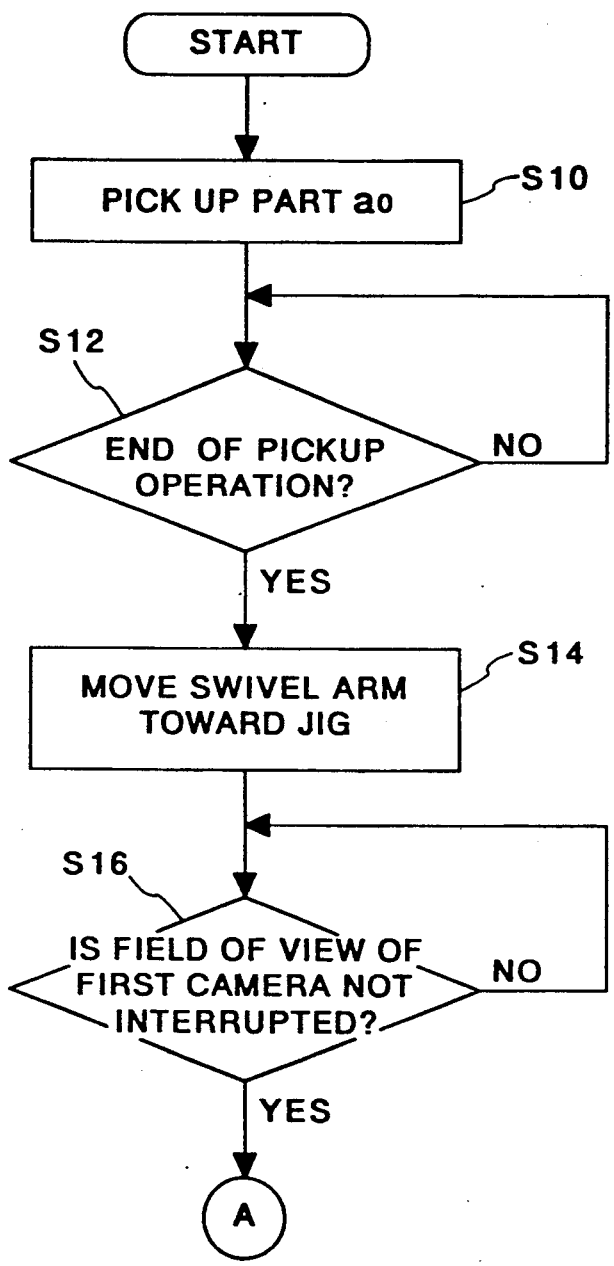
F I G. 8A

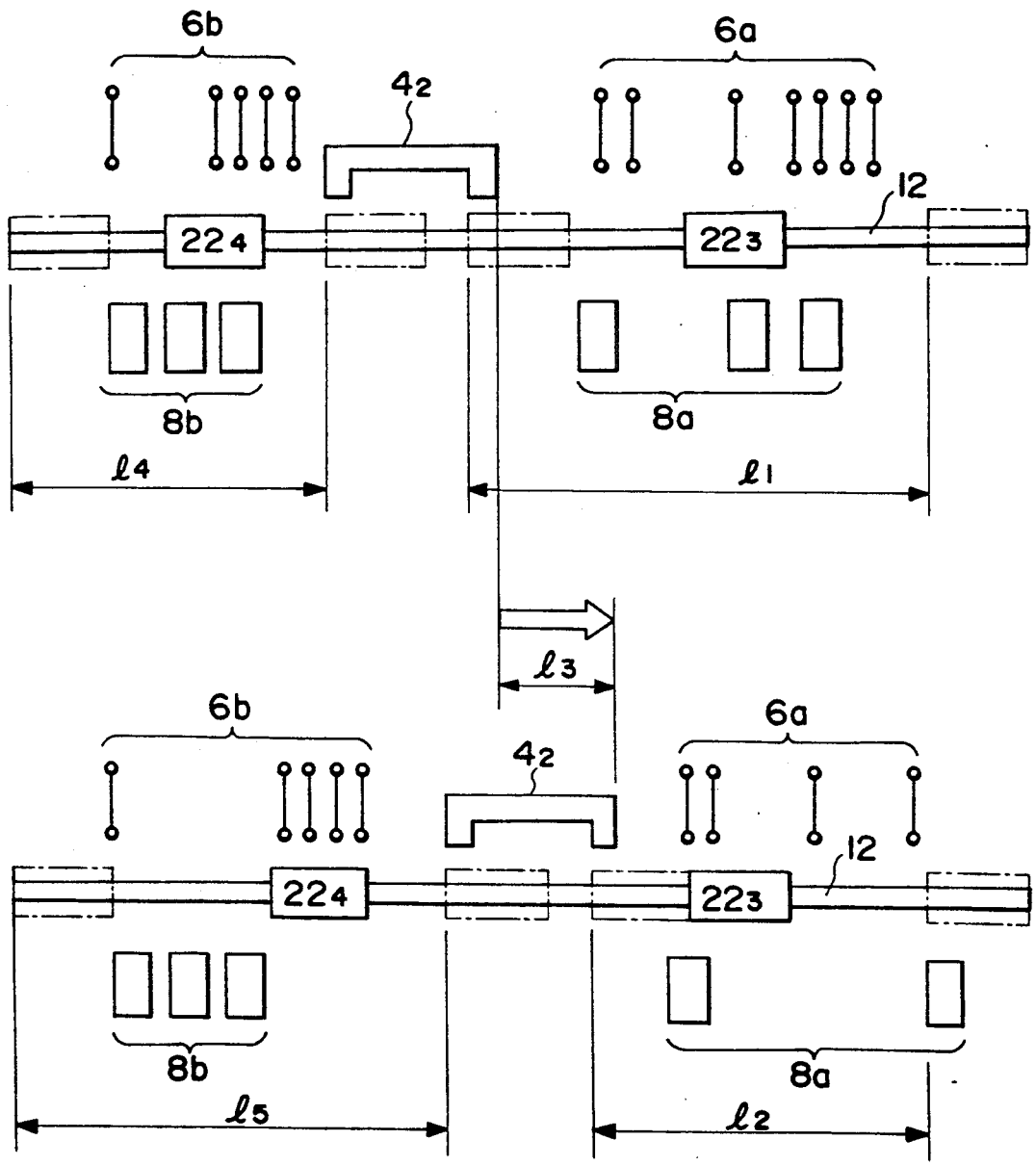
F I G. 16

METHOD OF ACCESSING AND ASSEMBLING PARTS IN AN ASSEMBLY APPARATUS INCORPORATING MOBILE ROBOTS

BACKGROUND OF THE INVENTION

The present invention relates to an article supply device and an automatic assembly apparatus for assembling a plurality of parts into a predetermined article supplied by the supply device while conveying a robot on a movable shuttle.

In a conventional automatic assembly apparatus, as disclosed in Japanese Patent Publication No. 63-33972, a large number of parts supply mechanisms for supplying a large number of parts to one robot are arranged around the robot. As an interlocking signal in operation control of the robot, a parts preparation end signal, and the like of each parts supply mechanism must be transmitted to a control mechanism of the robot. For this reason, in the conventional apparatus, the parts supply mechanisms are electrically connected to the control mechanism through connection cables to perform signal communications.

As described in an article supply device (U.S. Pat. No. 4,844,680) according to the prior application of the present applicant, a system wherein parts supply shelves are used to supply a large number of parts to a robot, a pallet storing necessary parts is drawn out from these parts supply shelves, and the robot accesses this pallet to pick up a necessary part, is known. In the conventional automatic assembly apparatus, in order to introduce a camera as a visual device for electrically checking parts alignment states in the pallets, the camera must be arranged above the pallet drawn out from the parts supply shelves.

A technique of causing a traveling robot to access a large number of parts, thereby picking them up as disclosed in Japanese Patent Publication No. 63-33972 described above is known. This patent publication also describes that a parts supply mechanism which integrally travels in synchronism with travel of the robot is adopted.

Since the conventional automatic assembly apparatus deals with a large number of parts, the number of parts supply mechanisms is increased. Thus, when the parts supply mechanisms are connected to the control mechanism of the robot through connection cables to communicate with it, the problems to be described below are posed.

That is, (1) When an automatic assembly apparatus is manufactured (arranged), the number of assembly steps (e.g., wiring) is increased, and cost of wiring (i.e., labor cost and cost of wiring materials) is considerable.

(2) Since the number of wirings is increased, a wiring error easily occurs.

(3) A sequence of the control mechanism of the robot requires input ports corresponding in number to the number of parts supply mechanisms. The increase in the number of ports causes an increase in cost of the sequence. When the number of objective parts is increased, the ports of the sequence become short, and the increase in the number of parts cannot be coped with.

SUMMARY OF THE INVENTION

The present invention has been made in consideration of the above situation and has as its first object to provide an automatic assembly apparatus which can connect parts supply mechanisms and a control mechanism in a non-contact state, and is suitable for production in small quantities of a large number of kinds of products while solving various problems caused by wiring cables.

In the automatic assembly apparatus disclosed in the second prior art, as a plurality of parts supply mechanisms, a plurality of parts are arranged in advance on a tray, and the tray is caused to integrally travel in synchronism with travel of a robot, so that the traveling robot can access and pick up parts. In this system, however, a plurality of parts must be simultaneously aligned in correspondence with an objective process, and a special-purpose tray must be prepared. Every time drawings of a product are corrected or the model of product is changed, a tray must be prepared again in correspondence with modified or new parts. Thus, it takes a long period of time to cope with a modification or change in model, and cost is increased. In a manufacturing operation, a preparation for arranging parts in advance on a tray must be performed, resulting in cumbersome operations.

The present invention has been made in consideration of the above situation, and has as its second object to provide an automatic assembly apparatus which can cope with replacement requests of parts within a short period of time at low cost, and is suitable for production in small quantities of a large number of kinds of products.

In the conventional automatic assembly apparatus, a camera is used to check part positions in a pallet, and a robot performs a pickup operation in response to a coordinate system obtained based on the checking information. However, when a camera is used, the camera can check an alignment state of parts after a pallet is drawn out. Thus, a wait time is required until parts are stabilized after a pallet is drawn out for pallet preparation. In addition to such a wasteful time, processing and calculation times for image fetching operation of a camera, image processing, conversion to a robot coordinate system, and the like are required. Thus, the robot must wait for a long period of time.

The present invention has been made in consideration of the above situation, and has as its third object to provide an automatic assembly apparatus which can efficiently operate a robot while checking an alignment state of parts to be picked up by a checking means, and is suitable for production in small quantities of a large number of kinds of products.

It is a fourth object of the present invention to provide a method of solving problems caused when a plurality of automatic assembly or machining apparatuses which perform assembly or machining operation of articles using a robot are connected.

A first robot and a supply device for supplying articles such as parts or units to the first robot are paired as one assembly (or machining) unit. In an assembly or machining system wherein a plurality of assembly units are connected, when operation times of first and second assembly units are different from each other, articles finished with operations in the first assembly unit are stopped in front of the second assembly unit. In this case, the operations of the first assembly unit must be stopped until the articles stopped in front of the second assembly unit are removed.

It is a fifth object of the present invention to provide an automatic assembly (or machining) apparatus in which a buffer device for holding articles finished with operations in the first assembly unit is arranged between the first and second assembly units to solve the above-mentioned problems.

It is a sixth object of the present invention to provide the invention associated with an improvement in the buffer device. In particular, according to this invention, there is provided a method of supplying articles. In this method, the buffer device comprises a convey means for, when assembly/machining times of the first and second assembly units are different from each other, continuously conveying a plurality of articles finished with operations in the first assembly unit from a supply port of the buffer to an exhaust port. Articles can be kept supplied to the buffer device while continuously executing the convey operation of the convey means, or articles can be exhausted from the buffer device to the second assembly unit while continuously executing the convey operation.

It is a seventh object of the present invention to provide an article supply device and method, in which a detection means for detecting a convey state of an article which is conveyed along a convey path of the convey means of the buffer device, and a control means for controlling supply of articles from the first assembly unit to the buffer device in accordance with a signal from the detection means are arranged, thereby smoothly executing a buffer function of the buffer device.

It is an eighth object of the present invention to provide an article supply method which can cope with another problem caused when a plurality of article supply means for supplying a plurality of articles to a robot for assembling or machining an article are aligned along a travel path of the robot, an assembly unit is constituted by the robot and the plurality of article supply means, and a plurality of the assembly units are connected through buffer devices.

More specifically, in an assembly system in which one assembly unit comprises a plurality of article supply means, a travel stroke of a robot varies depending on an increase/decrease in the number of articles to be supplied upon a modification of an objective product to be assembled or machined. In this case, when a long-period movement process in which the number of article supply means dealing with the large number of articles is large and a movement stroke of the robot is large is directly applied to an assembly mode of a small number of article supply means dealing a small number of articles, this undesirably causes interruptions in assembly processes.

Therefore, it is a ninth object of the present invention to provide an article supply method and an assembly apparatus which can overcome the above-mentioned problem.

It is a tenth object of the present invention to make proposals associated with some improvements of an article supply device which comprises a buffer device for temporarily stocking and holding articles between first and second assembly units when articles assembled or machined in the first assembly unit including a robot are transferred to the second assembly unit.

The first improvement is to provide an article supply device which can precisely transfer articles stocked in the buffer device to the second assembly unit, and can precisely perform assembly, machining, or generally working of an article transferred to the second assembly unit.

The second improvement is to provide a buffer device which can quickly modify an assembly system comprising the first and second assembly units and the buffer device.

In other words, this improvement is to provide a buffer device and an article supply device, in which when the robot of the first assembly unit is supplied with articles from a plurality of article supply means aligned along a robot travel path, if the number of article supply means is increased/decreased upon a modification of an objective product or unit to be assembled or machined, the buffer device can quickly modify a system.

Another improvement of the present invention relates to control of a convey speed of a convey means for conveying articles in the buffer device.

Travel belts for conveying an article (jig tray) received from the first assembly unit to a delivery position to the second assembly unit always travel at a high constant speed. The reasons for this are:

(1) New trays after modification of procedures including replacement of trays are transferred to the second assembly unit as quickly as possible after operations in the first assembly unit are completed, thereby improving operability of the robot.

(2) When a first robot in the first assembly unit malfunctions and is stopped, and there are no buffer trays to a second robot of the second assembly unit, trays after the first robot is restored and operations in the first assembly unit are completed are transferred to the second robot as quickly as possible, thereby improving operability of the second robot.

Since the belts always travel at high speed, however, the following drawbacks are posed.

(1) Noise of the belts and belt drive systems is large.

(2) When trays are stocked, the belts and trays are in frictional contact with each other, resulting in a short service life of a tray.

(3) Dust is produced since the belts, belt drive systems, trays, and conveyor structures are in frictional contact with each other, and this system is not suitable for an operation requiring cleanness.

According to the improvement of the present invention, in an automatic assembly or machining apparatus including a first assembly (machining) unit including a first robot for assembling or machining an article, and a second assembly (machining) unit for performing an additional operation of the article subjected to an operation in the first assembly unit, a buffer device for stocking and holding articles is arranged between the first and second assembly units, and communications of articles between the first and second assembly or machining units can be smoothly performed by switching a convey speed of an article in the buffer device in an article supply device between high and low speeds.

More specifically, the buffer device for stocking and holding articles is arranged between the first and second assembly or machining units. Only when an article is present at a reception position from the first robot, a convey speed between the reception position from the first robot and a delivery position to the second robot is increased, and otherwise, the convey speed is decreased.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A to 8C are flow charts showing an image fetching control sequence in a control mechanism;

FIG. 16 is a schematic plan view for explaining a movement state of a buffer mechanism in the second embodiment of an automatic assembly system according to the present invention;

DETAILED DESCRIPTION OF THE PREFERRED EMBODIMENTS

An arrangement of an embodiment of an automatic assembly system according to the present invention will be described in detail below with reference to the accompanying drawings.

Description of Overall Arrangement

Figure 1:
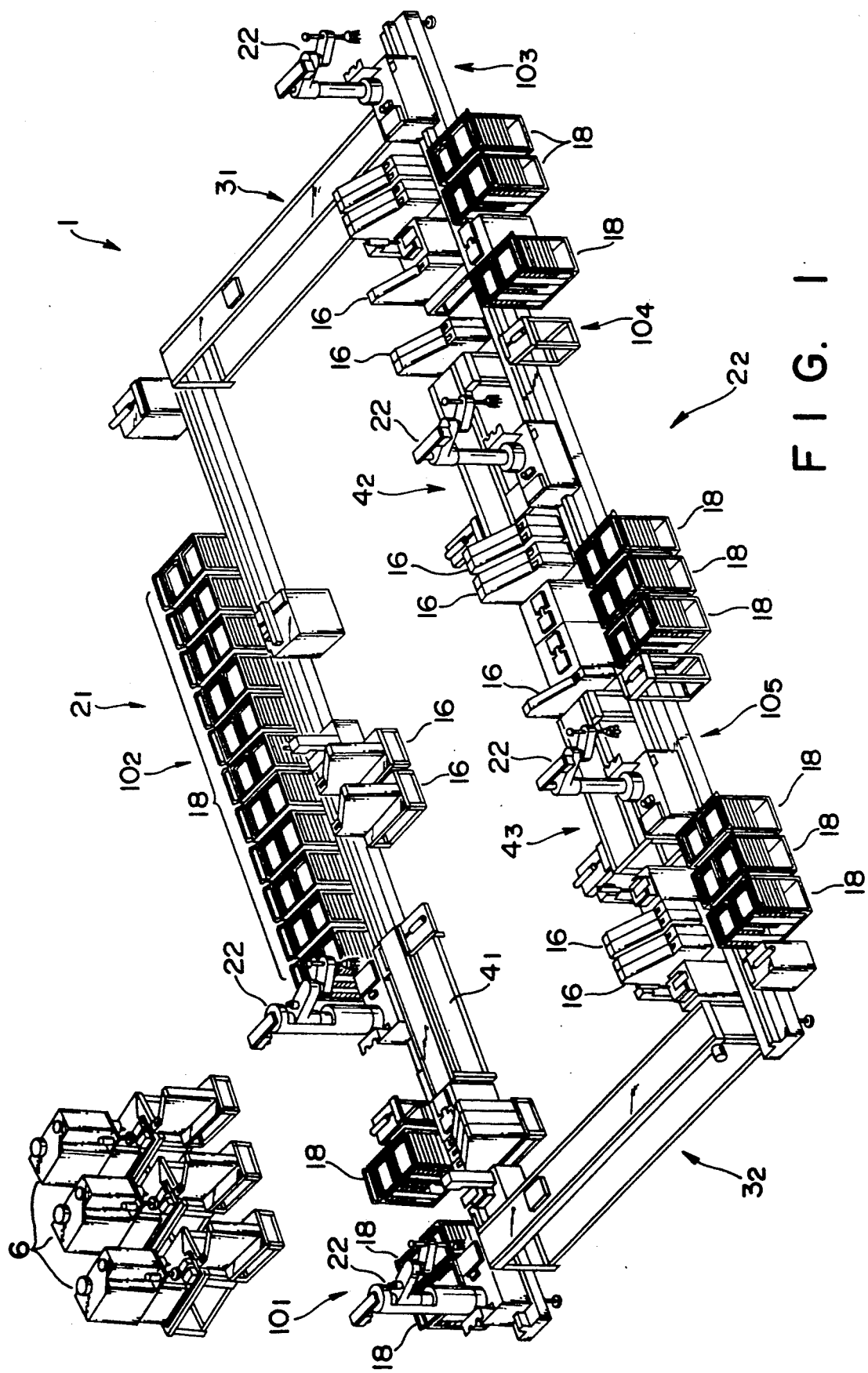
FIG. 1 is a perspective view showing the overall arrangement of an embodiment of an automatic assembly system according to the present invention.

The overall arrangement of an automatic assembly system according to the embodiment will be described below with reference to FIG. 1.

The automatic assembly system 1 comprises a pair of first and second automatic assembly apparatuses $2_1$ and $2_2$, a first coupling convey path $3_1$ for coupling the terminal end of the first automatic assembly apparatus $2_1$ and the starting end of the second automatic assembly apparatus $2_2$, and a second coupling convey path $3_2$ for coupling the terminal end of the second automatic assembly apparatus $2_2$ and the starting end of the first automatic assembly apparatus $2_1$, and constitutes a so-called closed-loop (endless) convey path.

Each of the automatic assembly apparatuses $2_1$ and $2_2$ receives parts from a large number of parts supply mechanisms 16 and 18 using a plurality of robots 22 (to be described later), and assembles these parts on a assembly jig 24. More specifically, the first assembly apparatus $2_1$ assembles a large number of assemblies which constitute a finished product, and the second automatic assembly apparatus $2_2$ receives the large number of assemblies assembled by the first automatic assembly apparatus $2_1$, and assembles these assemblies through a large number of parts to finally assemble the finished product.

Assembly of these parts is performed on the assembly jig 24, as described above. An assembly assembled by a given robot 22 is placed on a jig tray T prepared in correspondence with one finished product and is transferred to the next robot 22 through a buffer mechanism 4 (to be described later).

The first coupling convey path $3_1$ conveys the large number of assemblies assembled by the first automatic assembly apparatus $2_1$ and placed on the jig tray T to the starting end of the second automatic assembly apparatus $2_2$. The second coupling convey path $3_2$ conveys the empty jig tray T to the starting end of the first automatic assembly apparatus $2_1$ to recover the jig tray T after the finally assembled finished product has been removed from the jig tray T at the terminal end of the second automatic assembly apparatus $2_2$. In other words, in the automatic assembly system 1, a finished product is assembled from a large number of parts on one jig tray T while the jig tray is endlessly conveyed.

The first automatic assembly apparatus $2_1$ is constituted by coupling first and second automatic assembly units $10_1$ and $10_2$ in tandem with each other, and the second automatic assembly apparatus $2_2$ is constituted by coupling third to fifth automatic assembly units $10_3$ to $10_5$ in tandem with each other.

The automatic assembly units $10_1$ to $10_5$ basically have the same arrangement, and each unit basically comprises one shuttle base 12, a shuttle 20 traveling along the shuttle base 12, one robot 22 and one assembly jig 24 which are mounted on the shuttle 20, and a plurality of parts supply mechanisms 16 and 18 which are independently and detachably disposed, as will be described in detail later. Note that in this embodiment, the shuttle bases 12 of the first and second automatic assembly units $10_1$ and $10_2$ constituting the first automatic assembly apparatus $2_1$ are connected to each other to constitute a continuous shuttle base connected body. The shuttle bases 12 of the third to fifth automatic assembly units $10_3$ to $10_5$ constituting the second automatic assembly apparatus $2_2$ are connected to each other to constitute a continuous shuttle base body.

Figure 2:
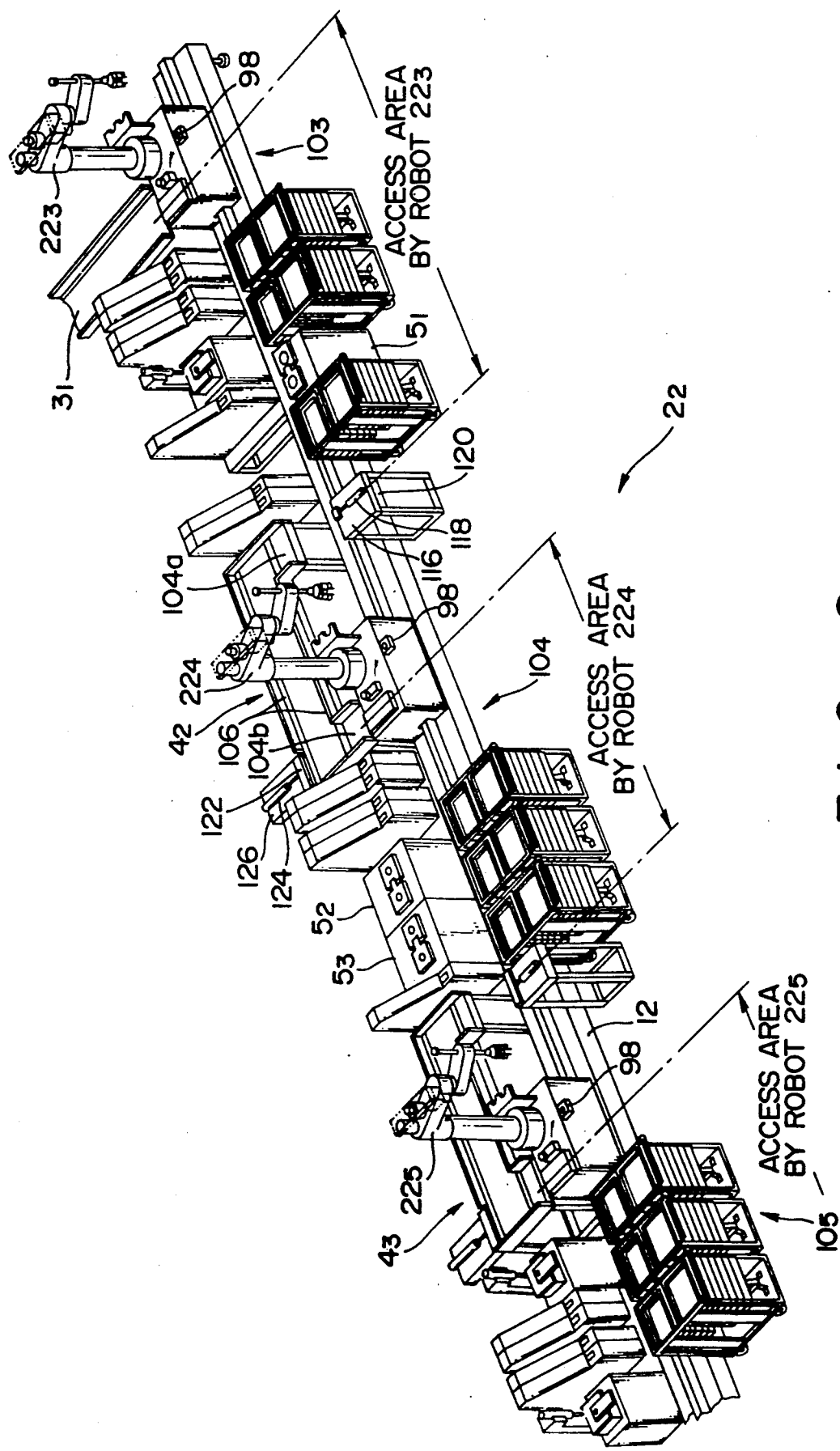
FIG. 2 is a perspective view showing an arrangement of a second automatic assembly apparatus in FIG. 1.

In each of the automatic assembly units $10_1$ to $10_5$, for example, as shown in FIG. 2, each robot 22 has a travel range (access range) defined by an extending range of the corresponding shuttle base 12, and shuttles within this shuttle base 12.

The first automatic assembly apparatus $2_1$ comprises a first buffer mechanism $4_1$ for transferring, to the second automatic assembly unit $10_2$, the jig tray T on which an assembly assembled by the first automatic assembly unit $10_1$ is placed. The second automatic assembly apparatus $2_2$ comprises a second buffer mechanism $4_2$ for transferring, to the fourth automatic assembly unit $10_4$, the jig tray T on which a plurality of assemblies assembled up to the third automatic assembly unit $10_3$ are placed, and a third buffer mechanism $4_3$ for transferring, to the fifth automatic assembly unit $10_5$, the jig tray T on which a plurality of assemblies assembled up to the fourth automatic assembly unit $10_4$ are placed.

The above-mentioned first and second coupling convey paths $3_1$ and $3_2$ have substantially the same buffer function as that of the buffer mechanisms 4. A difference between the convey paths and the buffer mechanisms is that each buffer mechanism 4 is formed into a substantially U shape, while the first and second coupling convey paths $3_1$ and $3_2$ are linearly arranged.

The buffer mechanisms 4 ($4_1$ to $4_3$) have the same arrangement, and a detailed arrangement thereof will be described later.

In the second automatic assembly apparatus $2_2$, as shown in FIG. 2, a plurality of reverse mechanisms 5 for reversing the vertical positional relationship of assemblies placed on the jig tray T are disposed at appropriate positions, e.g., at a total of three positions, as indicated by reference numerals $5_1$, $5_2$, and $5_3$ in this embodiment. Since the reverse mechanisms utilize known arrangements, a detailed description thereof will be omitted.

Furthermore, in the automatic assembly system 1, a plurality of microparts manufacturing machines 6 for manufacturing corresponding parts and filling the parts in tape cassettes 70 constituting first parts supply mechanisms 16 (to be described later) are aligned outside the endless convey path of the jig tray T described above. More specifically, when each tape cassette 70 executes a parts supply operation (to be described later) and parts stored therein are used up, the tape cassette 70 is detached from the corresponding shuttle base 12, and is conveyed to the corresponding microparts manufacturing machine to be filled with new parts. While the empty tape cassette 70 is detached from the shuttle base 12 and is subjected to a filling operation, another tape cassette 70 filled with the same kind of parts is attached at the empty position, and continues the parts supply operation to the corresponding automatic assembly unit.

Description of Automatic Assembly Unit

Figure 3:
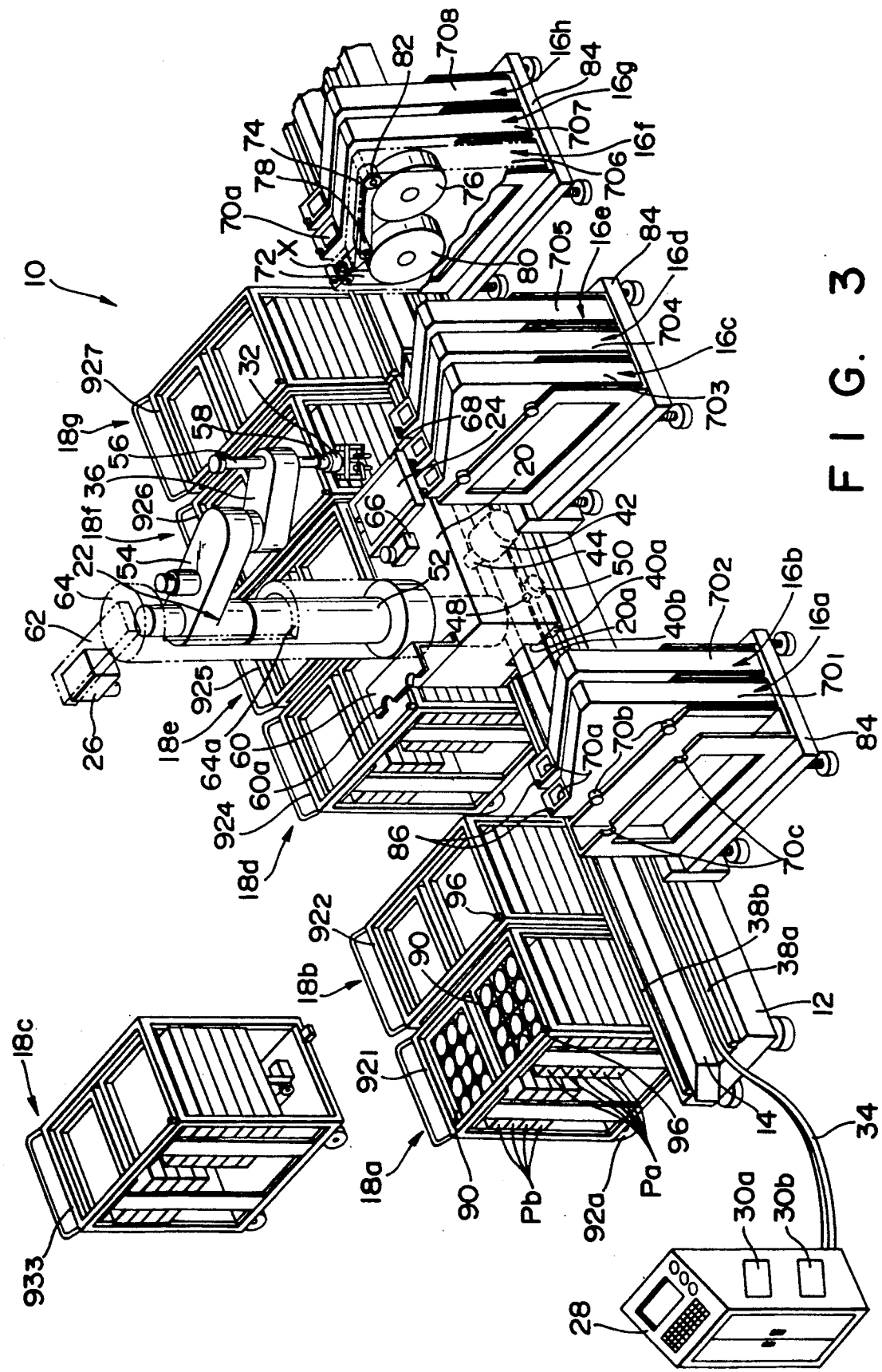
FIG. 3 is a perspective view showing the arrangement of an automatic assembly unit in each automatic assembly apparatus.

The overall arrangement of the automatic assembly units 10 ($10_1$ to $10_5$) of this embodiment will be described below with reference to FIG. 3. In the following description, since the automatic assembly units $10_1$ to $10_5$ basically have the same arrangement, reference numeral 10 represents an automatic assembly unit to be described below.

The automatic assembly unit 10 comprises the shuttle base 12 which linearly extends along one direction by a predetermined length. One main rail 14 for defining a track extending along the one direction is placed on the shuttle base 12. A plurality of first parts supply mechanisms 16 (more specifically, 12 first parts supply mechanisms 16a to 16l) are disposed along the one direction on one side of (in front the shuttle base 12 in FIG. 3, and a plurality of second parts supply mechanisms 18 (more specifically, 10 second parts supply mechanisms 18a to 18j) are disposed on the other side of (behind) the shuttle base 12 in FIG. 3. In other words, the shuttle base 12 extends in a space sandwiched between the first and second parts supply mechanisms 16 and 18.

The shuttle 20 is placed on the shuttle base 12 to be able to travel (be self-propelled) along the main rail 14. The robot 22, the assembly jig 24, and a first camera 26 as a photographing mechanism are mounted on the shuttle 20. A control mechanism 28 is arranged on a base (not shown). The control mechanism 28 causes the shuttle 20 to travel along the main rail 14, so that the robot 22 sequentially accesses the plurality of parts supply mechanisms 16 and 18 to assemble a predetermined assembly on the assembly jig 24.

The first camera 26 is fixed to the shuttle 20, is integrally moved upon travel of the shuttle 20, and photographs an alignment state of parts X in each parts supply box (to be simply referred to as a pallet hereinafter) P (more specifically, a position offset state on a plane) and a rotation state about a vertical axis in each second parts supply mechanism 18. The photographing information (image information) is supplied to a first checking unit 30a in the above-mentioned control mechanism 28, and the parts alignment state is checked by the first checking unit 30a.

The control mechanism 28 also controls appropriate part pickup position and posture via a finger unit 32 of the robot 22 on the basis of part alignment information checked by the first checking unit 30a. In order to make drive control of the robot 22 and travel control of the shuttle 20 by the control mechanism 28, the control mechanism 28 is connected to the shuttle 20 and the robot 22 through a flexible connection cord 34.

When a pickup operation of part X by the robot 22 is completed in the second parts supply mechanism 18 and an arm 36 of the robot 22 moves from the position above the second parts supply mechanism 18, the control mechanism 28 checks the alignment state of parts X in the pallet P of the second parts supply mechanism 18 through the first checking unit 30a. The control mechanism 28 detects and stores the position of a part X which is to be picked up in the next part pickup operation by the robot 22, and drives the finger unit 32 of the robot 22 to pick up the position detected part X in the next pickup operation.

Description of Shuttle

The shuttle 20 and components mounted on the shuttle 20 will be described in detail below.

A pair of guide rails 38a and 38b are fixed on the shuttle base 12 at two sides of the main rail 14 to be parallel to the main rail 14. The shuttle 20 comprises, in its lower surface, a recess portion 20a through which the main rail 14 is inserted and which extends along the one direction. Guide bearings 40a and 40b are fixed on two sides of the recess portion 20a. The guide bearings 40a and 40b are fitted on the guide rails 38a and 38b from above to define the travel direction of the shuttle 20 in the above-mentioned one direction.

A driving motor 42 for shuttle travel is housed in the shuttle 20. The driving motor 42 can be reversibly rotated. A driving wheel 44 is fixed to the distal end of the driving motor 42. The driving wheel 44 is in rolling contact with the main rail 14 while being compressed by a compression mechanism (not shown). With this arrangement, when the driving motor 42 is started, the driving wheel 44 is rotated, and rolls along the main rail 44 while being frictionally engaged therewith. In this manner, the shuttle 20 travels (shuttles) on the main rail 14 along one direction.

A rack 46 extending in one direction is disposed on the shuttle base 12 to be sandwiched between the main rail 14 and one guide rail 38a. A pinion gear 48 is rotatably and axially supported in the shuttle 20 to be meshed with the rack 46. A rotary encoder 50 for detecting a rotational amount of the pinion gear 48 is attached to the rotating shaft of the pinion gear 48. In this manner, since the pinion gear 48 is rotated upon travel of the shuttle 20, the rotational amount is detected by the rotary encoder 50, thereby detecting a travel amount (travel distance) of the shuttle 20.

Description of Robot

The robot 22 comprises a robot body 52 fixed upright on the shuttle 20, a first swivel arm 54 mounted on the upper portion of the robot body 52 to be rotatable about the vertical axis, a second swivel arm 36 mounted on the distal end of the first swivel arm 54 to be rotatable about the vertical axis, and a Z-axis arm 56 vertically movably mounted on the distal end of the second swivel arm 36. The finger unit 32 is attached to the lower end of the Z-axis arm 56 through a finger attachment 58. The finger unit 32 is arranged as a general purpose finger unit having three fingers.

The robot 22 comprises a first driving motor for rotating the first swivel arm 54, a second driving motor for rotating the second swivel arm 36, a third driving motor for vertically moving the Z-axis arm 56, and a fourth driving motor for rotating the Z-axis arm 56 although not shown. When these first to fourth driving motors are appropriately driven, the finger unit 32 can be moved to an arbitrary position within a range of a circle having, as a radius, a distance between the center of the robot body 52 and the center of the Z-axis arm 56 when the first and second swivel arms 54 and 36 are linearly set.

In other words, since the robot 22 is moved according to travel of the shuttle 20, the finger unit 32 can be moved within a range over the distances l from the center of the robot body 52 toward its two sides, i.e., can desirably access the parts present within this range.

A finger stocker 60 is disposed on the shuttle 20 independently of the robot body 52. The finger stocker 60 detachably loads a plurality of different finger units, so that an arbitrary finger unit 32 can be attached to the lower end of the Z-axis arm 56 through the finger attachment 58. The finger stocker 60 has a substantially U-shaped notch 60a and a lock pin (not shown). Each finger unit 32 has a stepped axial portion (not shown) which can be fitted in the notch 60a. When the stepped axial portion is engaged with the notch 60a, an interchangeable finger unit (not shown) can be stocked in the finger stocker 60.

Description of Camera

The first camera 26 described above photographs an alignment state of parts X stored in each pallet P of the second parts supply mechanism 18. The first camera 26 is fixed to a first camera pole 64 through a bracket 62 so as to check the entire pallet P from a position above each second parts supply mechanism 18. The pole 64 is fixed on the shuttle 20 to surround the robot body 52. An opening 64a is formed in the pole 64 over a turning range of the first swivel arm 54 so as not to disturb the turning operation of the arm 54.

A second camera 66 is mounted on the shuttle 20 so that the finger unit 32 can be photographed from below. The image of the finger unit 32 photographed by the second camera 66 is supplied to a second checking unit 30b in the control mechanism 28. The second checking unit 30b can check a pickup state of a part X picked up by the finger unit 32 on the basis of the image information supplied from the second camera 66.

Description of Assembly Jig

Although not shown in detail, the assembly jig 24 is constituted by a jig mounting guide 68, and a tray T which is aligned with and fixed to the jig mounting guide 68 on the shuttle 20 by a jig positioning lock pin (not shown). The assembly jig 24 is suitable for assembling a predetermined assembly from 12 kinds of parts supplied from the first parts supply mechanisms 16a to 16l and 10 kinds of parts supplied from the second parts supply mechanisms 18a to 18j.

Description of First Parts Supply Mechanism

The first parts supply mechanism 16 will be described below with reference to FIGS. 3 and 4.

The first parts supply mechanism 16 supplies parts via a convey tap (carrier tape) 72 (to be described later), more specifically, holds a large number of parts in a large number of recesses formed in line in the carrier tape along its convey direction, and causes the carrier tape to travel, thereby conveying the parts to a pickup position.

In this embodiment, as described above, the 12 first parts supply mechanisms 16a to 16l are equipped. Different kinds of parts are supplied from these first parts supply mechanisms 16a to 16l. Since the first parts supply mechanisms 16a to 16l have the same arrangement, the reference numeral of the first parts supply mechanism is represented by "16" in a description of its arrangement. The same applies to the second parts supply mechanisms 18 (18a to 18j).

The schematic arrangement of each first parts supply mechanism 16 will be described below. The parts supply mechanism 16 comprises a hollow tape cassette 70. The tape cassette 70 houses a roll of the carrier tape 72 which holds a plurality of parts X at constant pitches.

Upon conveyance of the carrier tape 72, parts X held on the tape 72 can be sequentially supplied to an opening 70a formed in the upper surface portion of the tape cassette 70 near the shuttle base 12. The opening 70a is defined at a position which can be accessed by the robot 22 when the tape cassette 70 is mounted on the shuttle base 12 (i.e., a range separated sideways by a maximum of the distance l from the center of the robot body 52).

More specifically, in each tape cassette 70, the above-mentioned carrier tape 72 stores parts X in a plurality of recesses thereof, and is wound around a supply reel 76 while being covered with a cover tape 74. The carrier tape 72 is conveyed to the parts pickup position (opening 70a) while being covered with the cover tape 74, and the cover tape 74 is peeled from the carrier tape 72 through a separation roller 78 immediately before the parts pickup position. The carrier tape 72 with the exposed recesses are taken up by a first takeup reel 80 through the parts pickup position, and the cover tape 74 is taken up by a second takeup reel 82.

These reels 76, 80, and 82 are respectively connected to rotation driving mechanisms (not shown). Each of these mechanisms has a function of feeding the tape by a given pitch to supply the next part X to the parts pickup position when it is detected that the robot 22 picks up a certain part X. For this purpose, the mechanism incorporates a sensor and a controller (not shown).

Figure 4:
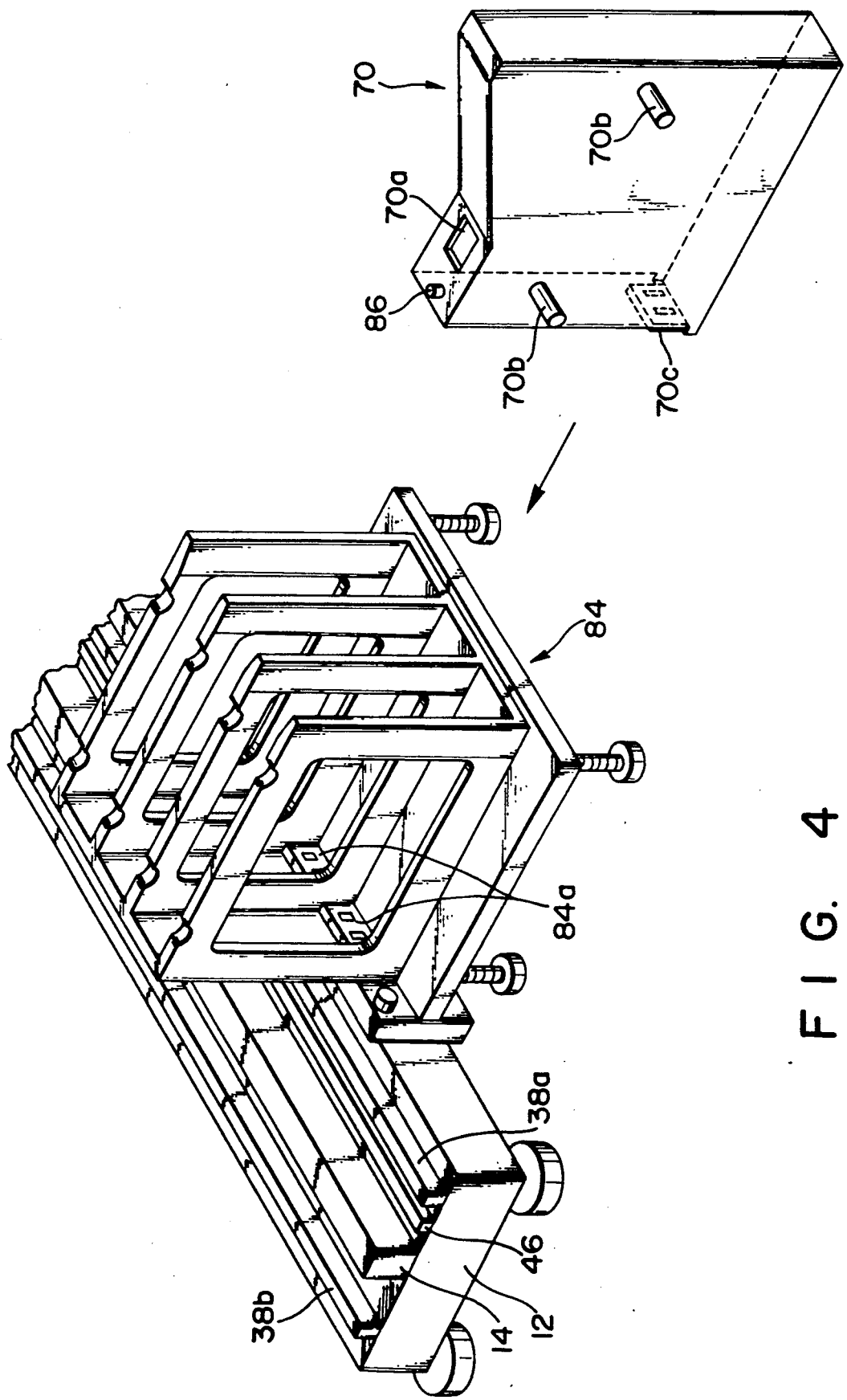
FIG. 4 is a perspective view showing arrangements of a tape cassette in a first parts supply mechanism and a carrier base for carrying the tape cassette.

As shown in FIG. 4, a set of one, two, or three tape cassettes 70 are aligned with and carried on a carrier base 84. More specifically, in this embodiment, the six carrier bases 84 for mounting 12 tape cassettes 70 are arrayed at one side of the shuttle base 12. Note that a carrier base for carrying two tape cassettes 70 and a carrier base for carrying one tape cassette 70 do not have special structures, but commonly employ the carrier base 84 for carrying three tape cassettes 70.

A maximum of one carrier base 84 can be arranged in correspondence with a cart 92 as the second parts supply mechanism 18 (to be described later). When the tape cassettes 70 need not correspond to one cart 92 depending on a parts supply state, the carrier base 84 is not arranged in correspondence with the cart 92.

In this manner, the tape cassettes 70 constituting the 12 first parts supply mechanisms 16a to 16l are independently and detachably carried on the shuttle base 12 through the corresponding carrier bases 84.

A power receiving terminal 70c is arranged on the lowermost portion of the front surface of each tape cassette 70. A power supply terminal 84a is arranged in a vertically equal height on a lower portion of a blocking plate facing the power receiving terminal 70c when the tape cassette 70 is carried on the carrier base 84. In this manner, when the tape cassette 70 is loaded on the carrier base 84, the power receiving terminal 70c is coupled to the power supply terminal 84a, and electrical power is supplied to electrical driving portions of the tape cassette 70, e.g., the driving motors, and the like for rotating the reels 76, 80, and 82.

A lamp 86 for signaling a parts pickup enable state from the tape cassette 70 is mounted on the upper surface of each tape cassette 70 at a position nearer the shuttle base 12 than the opening 70a. The lamp 86 is connected to a cassette control mechanism (not shown). In the cassette control mechanism, since each part is allowed to be picked up when each recess for storing a part of the carrier tape 72 is moved to a position facing the opening 70a, the lamp 86 is turned on to signal completion of parts pickup preparation at that time.

Figure 6:
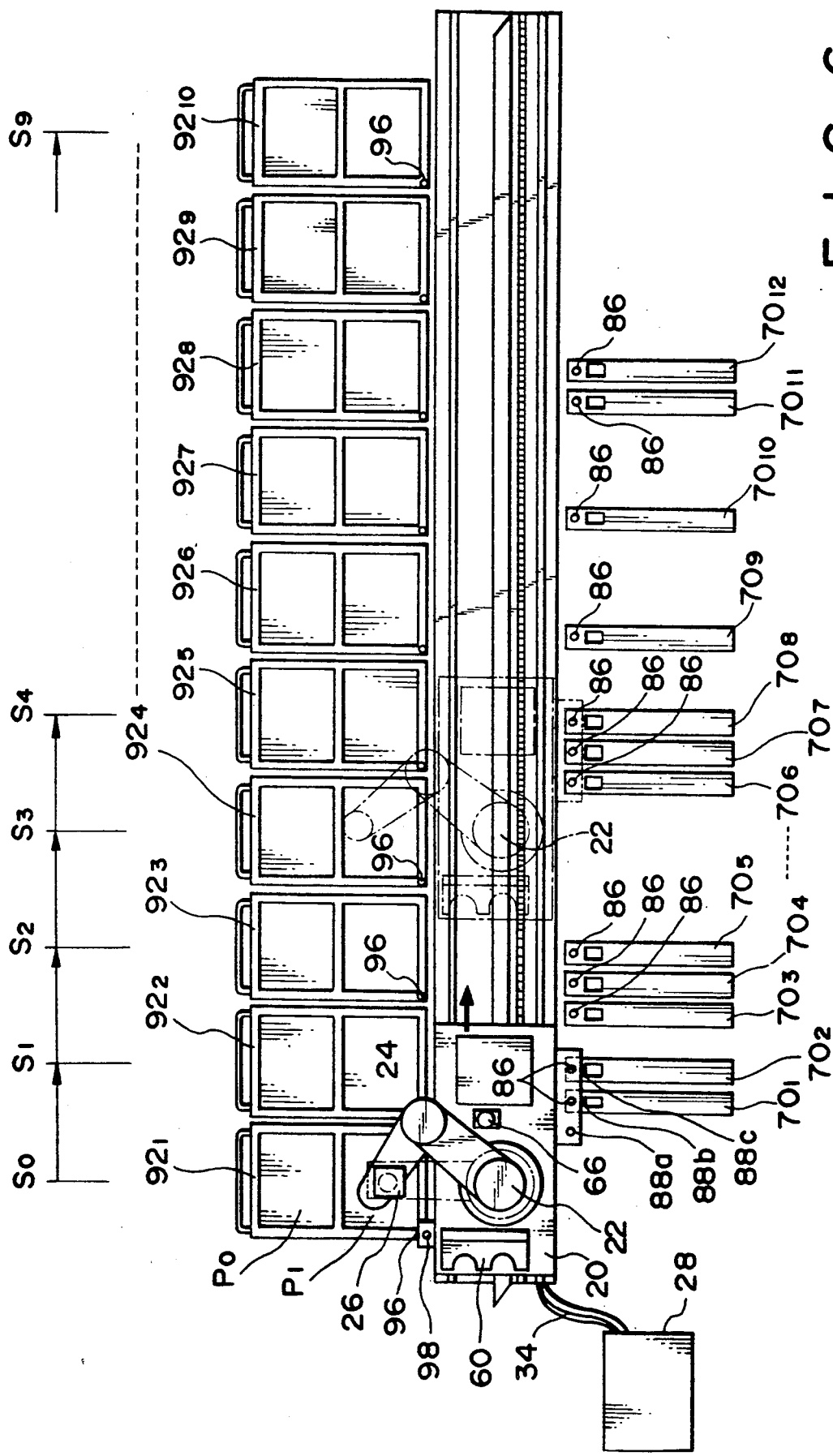
FIG. 6 is a plan view showing the arrangement of the automatic assembly unit shown in FIG. 1.

As shown in FIG. 6, light-receiving elements 88a to 88c are arranged on the side surface of the shuttle 20 at predetermined positions corresponding to the lamps 86 of a maximum of three tape cassettes 70 carried on the corresponding carrier base 84 which is held in position to face one of the second parts supply mechanisms 18a to 18j. The light-receiving elements 88a to 88c are connected to the control mechanism 28. Upon reception of ON signals output when these light-receiving elements 88a to 88c receive light emitted from the corresponding lamps 86, the control mechanism 28 enables the robot 22 to start a pickup operation of parts from the tape cassettes 70 as the first parts supply mechanism 16.

When the cassette control mechanism detects that the remaining number of parts held on the carrier tape 22 is decreased below a predetermined value, it flashes the lamps 86. When the flashing operation of the lamp 86 is detected through a corresponding one of the light-receiving elements 88a to 88c, the control mechanism 28 causes a display mechanism (not shown) to display (or instruct) a replacement operation of the corresponding tape cassette in the first parts supply mechanism 16.

In the first parts supply mechanism 16 with the above arrangement, when a replacement instruction of the tape cassette 70 is issued, an operator detaches the corresponding tape cassette 70 from the carrier base 84 upon completion of the parts pickup operation from the tape cassette 70, and places it on a push car (not shown) to convey it to a parts filling mechanism (not shown). The operator then causes the parts filling mechanism to fill parts in the carrier tape 22. At the same time, the operator carries another tape cassette 70 filled with parts in advance by the parts filling mechanism on the push car, and mounts it on the carrier base 84 through an empty cassette receiving portion 84f. In this manner, while the robot 22 executes assembly by picking up parts from another tape cassette 70 or the second parts supply mechanism 18, the replacement operation of the tape cassette 70 can be completed, and this replacement operation can be executed without interrupting the assembly by the robot 22, resulting in high operation efficiency.

Description of Second Parts Supply Mechanism

Figure 5:
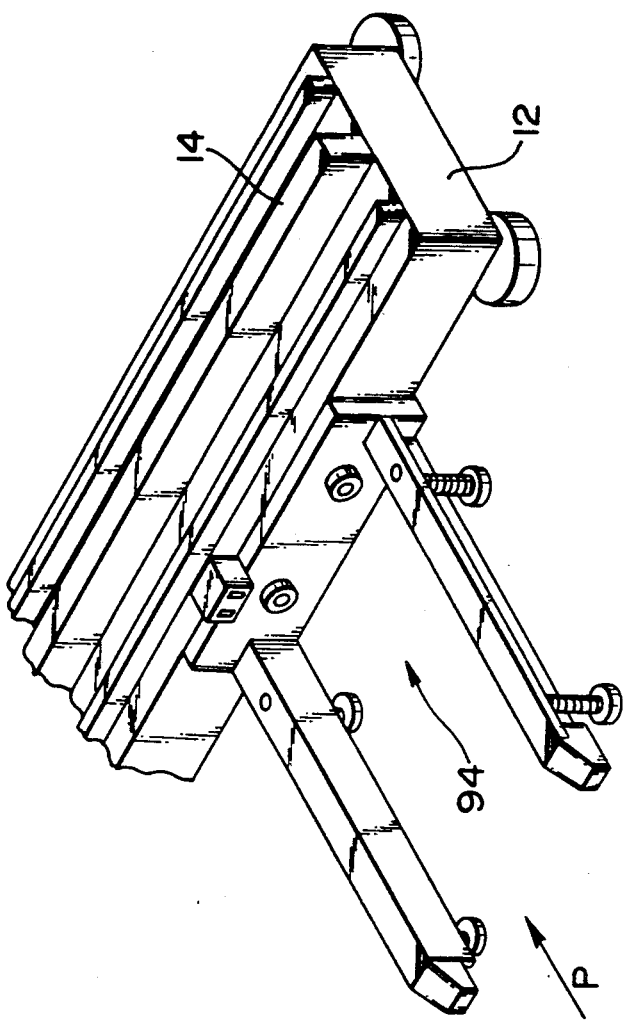
FIG. 5 is a perspective view showing arrangements of a cart in a second parts supply mechanism, and a mounting mechanism for mounting the cart.
Figure 5:
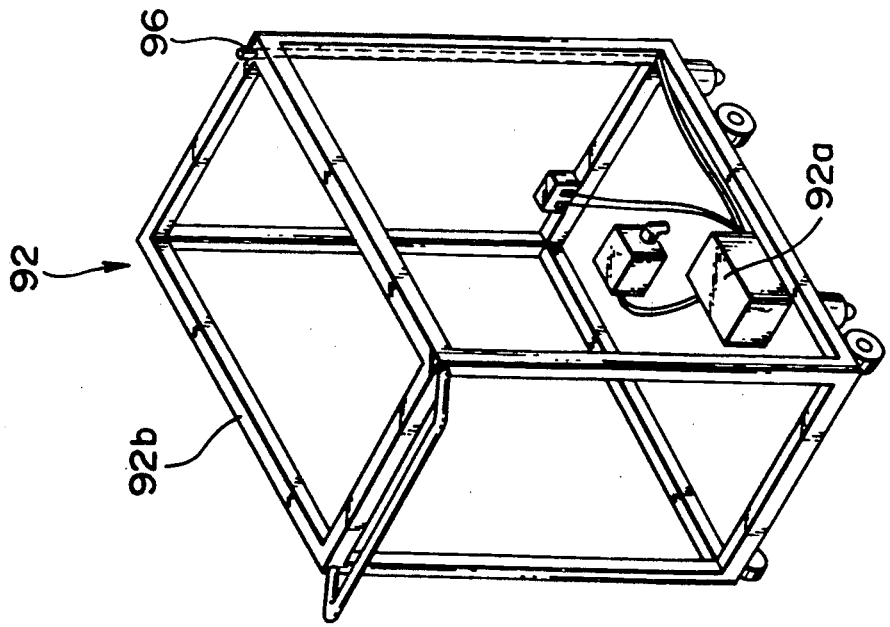

The arrangement of the second parts supply mechanism 18 will be described below with reference to FIGS. 3 and 5.

The second parts supply mechanism 18 supplies parts through the pallet P as the parts supply box described above. More specifically, the mechanism 18 holds a large number of parts which are arrayed on the entire surface in the pallet P, and picks up the parts from the pallet P.

The pallet P has an entirely open upper surface so that the parts alignment state can be checked by the above-mentioned first camera 26. Partition walls 90 are arranged to be perpendicular to each other so as to prevent overlapping and contact of adjacent parts. A parts storage space S is defined by spaces among the partition walls 90, and one part is stored in each parts storage space S.

In FIG. 6, reference symbol $P_1$ designates a nonempty pallet which stores parts; and $P_0$, an empty pallet in which parts are used up, and which becomes empty.

The second parts supply mechanism 18 comprises the pallet supply cart (to be simply referred to as a cart hereinafter) 92 for storing a plurality of pallets P. The cart 92 will be briefly described below. The cart 92 stacks and stocks a plurality of pallets P storing the same kind of parts, and separates nonempty pallets $P_1$ one by one to align the separated pallet $P_1$ at an accessible level position for the robot 22. The cart 92 receives and stacks empty pallets $P_0$ in which parts are used up. The cart 92 incorporates a drive motor/sensor control mechanism (cart control mechanism) 92a for achieving the above-mentioned functions. More specifically, as shown in FIG. 5, the cart control mechanism 92a, connected to a power receiving terminal 92c, for controlling the operations of the cart 92 is arranged in a base frame 92b.

A lamp 96 for signaling a parts pickup enable state from the cart 92 is mounted on a portion, adjacent to the shuttle base 12, of the upper surface of each cart 92. The lamp 96 is connected to a cart control mechanism 92g. The cart control mechanism 92 turns on the lamp 96 to signal completion of parts pickup preparation when the pallet P is moved to a pickup position since a parts pickup operation is enabled.

As shown in FIG. 6, a light-receiving element 98 is mounted on the side surface of the shuttle 20 at a predetermined position corresponding to the lamp 96 of one of the second parts supply mechanisms 18a to 18j when the shuttle 20 is fixed in position to face one second parts supply mechanism. The light-receiving element 98 is connected to the above-mentioned control mechanism 28. Upon reception of an ON signal output when the light-receiving element 98 receives light emitted from the lamp 96, the control mechanism 28 enables the robot 22 to start a parts pickup operation from the cart 92 as the second parts supply mechanism 18.

When the above-mentioned cart control mechanism 92g detects that the remaining number of parts stored in all the pallets P is decreased below a predetermined value, it flashes the lamp 96. When the control mechanism 28 detects the flashing operation of the lamp 96 through the light-receiving element 98, it causes a display mechanism (not shown) to display (or instruct) a replacement operation of the corresponding cart 92 in the second parts supply mechanism 18.

When a replacement instruction of the cart 92 is issued in the second parts supply mechanism 18 with the above arrangement, an operator detaches the cart 92 from a mounting mechanism 94, and carries it to a parts filling mechanism (not shown). The operator causes the parts filling mechanism to fill parts in the pallets P, and at the same time, sets other pallets P filled with parts in advance by the parts filling mechanism in the cart 92. The operator then mounts the cart 92 on the empty mounting mechanism 94. In this manner, the replacement operation of the cart 92 can be completed while the robot 22 executes assembly by picking up parts from another cart 92 or the first parts supply mechanism 16. The replacement operation can be executed without interrupting assembly by the robot 22, resulting in high operation efficiency.

Positional Relationship Between First and Second Parts Supply Mechanisms

The positional relationship between the first and second parts supply mechanisms 16 and 18 will be described in detail below with reference to FIG. 6.

As described above, a movable area (access area) of the robot 22 corresponds to a range indicated by reference symbol A, which is a range defined by the distance from the center of the robot body 52, as shown in FIG. 6, when the robot 22 is located at a position $S_0$ in FIG. 6. The parts pickup sections of the first and second parts supply mechanisms 16 and 18 are set within the range A, that is:

(1) a front half of a first cart $92_1$ (in the following description, reference numerals $92_1$ to $92_{10}$ are used when 10 carts 92 are to be identified), in other words, one nonempty pallet P;
(2) the assembly jig 24;
(3) the second camera 66 for checking the state of the finger unit;
(4) the parts pickup openings 70a of two tape cassettes $70_1$ and $70_2$ (in the following description, reference numerals $70_1$ to $70_{12}$ are used when 12 tape cassettes 70 are to be identified); and
(5) the finger stocker 60

The robot 22 has the same access area even when it is moved to any position. For example, the shuttle 20 indicated by an alternate long and short dashed line travels from a state at the travel start position $S_0$ indicated by a solid line (i.e., a state opposing the first cart $92_1$) to a position $S_3$ opposing the fourth cart $92_4$ along a direction of an arrow R in FIG. 6. Changes in access area of the robot 22 in this case from the case wherein the robot 22 was located at the position $S_0$ are that:

(1) an accessible cart is changed from $92_1$ to $92_4$; and
(2) an accessible tape cassettes are changed from $70_1$ and $70_2$ to $70_6$, $70_7$, and $70_8$.

In this manner, the shuttle 20 is positioned in correspondence with each of the first to tenth carts $92_1$ to $92_{10}$ from the left end position $S_0$ to states of $S_1, S_2, \ldots, S_{10}$ in FIG. 6, and the carts 92 and the tape cassettes 70 are arranged so that one of the carts $92_1, 92_2, \ldots, 92_{10}$ and one to three of the tape cassettes $70_1, 70_2, \ldots, 70_{12}$ can be accessed under the same positional condition.

In a state wherein the shuttle 20, that is, the robot 22 is stopped at a stop position corresponding to each cart 92, the three light-receiving elements 88a to 88c and one light-receiving element 98 mounted on the shuttle 20 correspond to the lamps 86 mounted on a maximum of three tape cassettes 70 and the lamp 96 mounted on the cart 92, respectively.

As a result, when the shuttle 20 and the robot 22 are aligned at the position $S_0$, as indicated by solid lines in FIG. 6, the light-receiving elements 88b and 88c receive light beams from the lamps 86 of the two tape cassettes $70_1$ and $70_2$ carried on the first carrier base 84, and the light-receiving element 98 receives light from the lamp 96 of the first cart $92_1$. Meanwhile, when the shuttle 20 and the robot 22 are conveyed to and stopped at the position $S_3$, as indicated by alternate long and short dashed lines in FIG. 6, the light-receiving elements 88a, 88b, and 88c respectively receive light beams from the lamps 86 of the three tape cassettes $70_6$, $70_7$, and $70_8$ carried on the third carrier base 84, and the light-receiving element 98 receives light from the lamp 96 mounted on the fourth cart $92_4$.

In other words, the arrangement of these light-receiving elements 88a to 88c coincides with the positional relationship of the carts 92 and the tape cassettes 70 which are arranged so that they can be accessed under the same positional condition after the shuttle 20 is moved, as described above. Therefore, the four light-receiving elements 88a to 88c and 98 can detect light-emission states of the 10 carts 92, the 12 tape cassettes 70, and all the lamps 86 and 96. As described above, the four light-receiving elements 88a to 88c and 98, the 10 carts 92, the 12 tape cassettes 70, and all the lamps 86 and 96 constitute a communication means for connecting a plurality of first and second parts supply mechanisms 16 and 18, and the control mechanism 28.

A hatched portion in FIG. 6 indicates the field of view of the first camera 18 for checking the interior of the pallet P when the shuttle 20 is located at the position $S_0$. This field of view is shifted upon movement of the shuttle 20, and always covers the nonempty pallet $P_1$ side of at least the robot 22 side on the cart 92 corresponding to the stop position of the shuttle 20.

Description of Assembly Sequence

A sequence for assembling a predetermined assembly from a plurality of parts by the automatic assembly unit 10 according to this embodiment will be described below with reference to FIGS. 7A to 7C.

For the sake of simplicity, the number of kinds of parts supplied from the pallets P of the carts 92 is assumed to be three, and the number of kinds of parts supplied from the carrier tapes 72 of the tape cassettes 70 is assumed to be four. In the following description, reference symbols a to g designate parts, and the sequence of assembling these parts is set like $a(t)\rightarrow b(c)\rightarrow c(c)\rightarrow d(t)\rightarrow e(t)\rightarrow f(t)\rightarrow g(c)$. Note that a symbol (c) in the part's name represents parts supply from the cart 92, and a symbol (t) represents parts supply from the tape cassette 70.

Figure 7A:
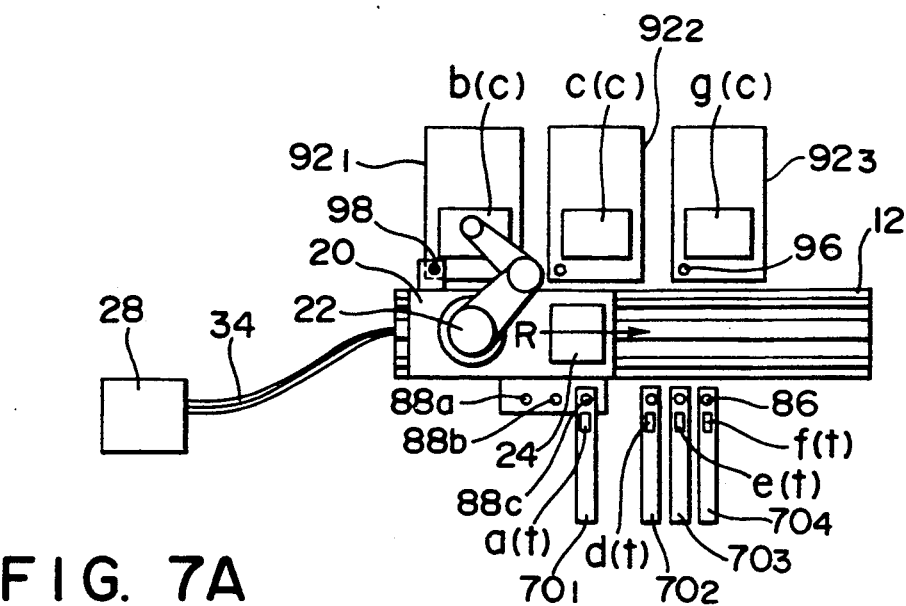
FIGS. 7A to 7C are plan views sequentially showing operations of a robot for picking up and assembling parts in accordance with travel of a shuttle.

In a state shown in FIG. 7A, the shuttle 20 on which the robot 22 is arranged is stopped and aligned at a position where the robot 22 can access parts b(c) in the first cart $92_1$, and parts a(t) in the tape cassette $70_1$.

At this time, the shuttle 20 is moved from a state shown in FIG. 7C (to be described later), determines upon reception of a signal from the rotary encoder 50 that it has been set in the state illustrated in FIG. 7A, and is stopped at that position. In the state shown in FIG. 7A, the robot 22 picks up a part a(t) from the carrier tape 72 first, and assembles it on the assembly jig 24. Then, the robot 22 picks up a part b(c) from the pallet P of the cart 92, and assembles it on the assembly jig 24.

Before this assembly, whether or not supply preparation of parts a(t) and b(c) is completed is checked in a non-contact manner by detecting ON states of the lamps 86 of the first tape cassette $70_1$ and the lamp 96 of the cart 92 through the light-receiving elements $88a$ to $88c$ and 98 mounted on the shuttle 20 almost simultaneously with alignment of the shuttle 20 to the state shown in FIG. 7A, in other words, through the communication means.

After completion of supply preparation is checked, the robot 22 executes assembly in the above-mentioned sequence. When the robot 22 picks up a part a(t) of the tape cassette 70, it is checked using an internal sensor of the finger unit 32 if the part is actually picked up, and it is also checked using an internal sensor of the tape cassette 70 if the part a(t) is picked up (i.e., removed from the carrier tape 72).

In the first tape cassette $70_1$, after these pickup checking operations, the carrier tape 72 is conveyed by a given pitch by the self driving sources, and alignment preparation for a new part $a(t)_n$ to be used next is started. This preparation need only be completed until the part $a(t)_n$ is dealt in the next parts pickup cycle. When the preparation is completed, the lamp 86 is turned on.

The robot 22 is operated in response to a coordinate system obtained based on position information of a part b(c) checked by the first camera 26 for checking the interior of the pallet in the previous parts pickup cycle in the first cart $92_1$, thereby picking up the part b(c) from the pallet P. The pickup state is checked by the internal sensor of the finger unit 32. Thereafter, the swivel arms 36 and 54 are turned, thus conveying the picked up part b(c) to the assembly jig 24.

When the swivel arm 36 moves from a position above the pallet P storing the picked up part b(c), the position of a part $b(c)_n$ to be picked up in the next cycle in the pallet P storing the picked up part b(c) in the immediately preceding cycle is checked by the first camera 26, arranged on the shuttle 20, for checking the interior of the pallet, and an image is stored in an image memory of an image processing unit in the control mechanism 28. Image processing after the image is stored, coordinate conversion to a coordinate system of the robot 22, and the like need only be completed when the part $b(c)_n$ is dealt in the next cycle, and are processed to be parallel with the control operation of the robot 22.

After the image storing operation is completed, the shuttle 20 starts movement toward the direction R in turn upon an instruction from the control mechanism 28. Since the image storing operation can be normally completed within about 1/30 sec, movement of the shuttle 20 is substantially started immediately after the swivel arm 36 is turned toward the assembly jig 24, as described above. Thus, the moving operation of the shuttle 20, assembly on the assembly jig 24 by the robot 22, and the like are simultaneously performed.

Figure 7B:
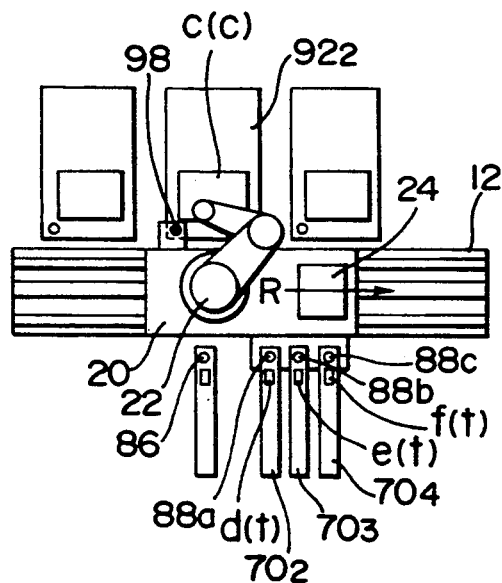

Thereafter, the shuttle 20 is set and stopped in a state wherein the robot 22 can access parts c(c), d(t), e(t), and f(t) to be assembled next, as illustrated in FIG. 7B. At this stop position, the light-receiving elements $88a$ to $88c$ detect ON states of the lamps 86 of the corresponding second to fourth tape cassettes $70_2$, $70_3$, and $70_4$, and the light-receiving element 98 detects an ON state of the lamp 96 of the second cart $92_2$, thereby checking completion of supply preparation of the parts c(c), d(t), e(t), and f(t).

It is also checked if assembly of the picked up part b(c) in the immediately preceding cycle is completed on the assembly jig 24. Thereafter, the pickup operations of the parts c(c), d(t), e(t), and f(t) and assembly of these parts on the assembly jig 24 are performed in the same manner as in FIG. 7A. An image storing operation for checking the position of a part $c(c)_n$ to be picked up in the next cycle is performed after the part c(c) is picked up, and the swivel arm 36 is moved toward the assembly jig 24. In the state shown in FIG. 7B, since the assembly of the parts d(t), e(t), and f(t) must be performed thereafter, completion of the pickup operation is checked by the internal sensor of the finger unit 32 after the part f(t) is picked up, and at the same time, the shuttle 20 starts movement in the direction R upon an instruction from the control mechanism 28 after the finger unit 32 is sufficiently moved upward not to collide against the fourth tape cassette $70_4$ if it is moved above the fourth tape cassette $70_4$. Thereafter, the shuttle 20 starts movement in the direction P upon an instruction from the control mechanism 28.

Figure 7C:
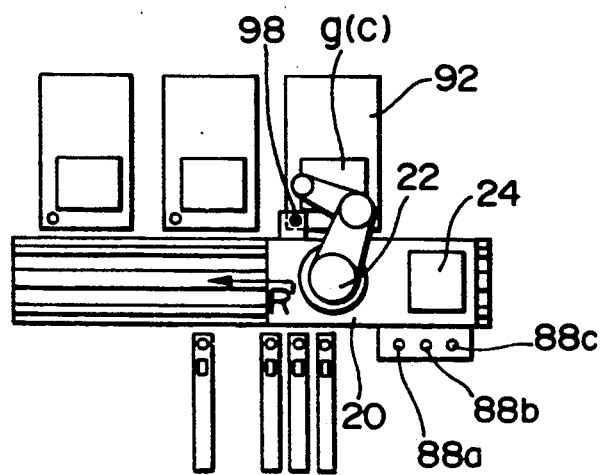

FIG. 7C shows a state wherein the shuttle 20 is aligned and stopped in a state wherein the robot 22 can access a part g(c). The part g(c) is a very thin part, and is picked up by vacuum suction. For this reason, even when completion of the pickup operation can be checked through the internal sensor of the finger unit 32, if the pickup position is offset from a predetermined position, this part cannot be assembled.

For this reason, after the part g(c) is picked up, the swivel arm 36 temporarily moves the finger unit 32 to a position above the second camera 66 to cause the second camera 66 to photograph a image of the part g(c) picked up by the finger unit 32, thereby accurately detecting the pickup position of the part. Upon reception of the photographing information from the second camera 66, the control mechanism 28 detects the pickup position of the picked up part g(c), and when it determines that the detected position falls within an allowable range, the swivel arm 36 is started again to move the finger unit 32 to a position above the assembly jig 24, thereby placing the part g(c) on the jig 24.

When the pickup position falls within an allowable range so that a part can be placed on the jig 24 if its setup position is corrected, the control mechanism 28 corrects a coordinate system of the finger unit 32 of the robot 22, thereby precisely setting the part g(c) on the jig 24. On the other hand, if it is determined that the pickup position is uncorrectable, assembly is interrupted, and a predetermined alarm is generated, thus causing an operator to perform a predetermined recovery operation.

In this manner, when an image storing operation by the first camera 36 is completed as in FIG. 7A after the last part g(c) is picked up, the shuttle 20 begins to move along a direction of an arrow R' opposite to the previous travel direction in accordance with an instruction from the control mechanism 28. After the shuttle 20 reaches the position shown in FIG. 7A, the operation described above with reference to FIG. 7A is restarted and repeated.

A finished product after assembly of the part g(c) described with reference to FIG. 7C is returned to and stored in an empty portion of the same pallet P before the part b(c)n of the next cycle is picked up, thereby completing one assembly cycle.

Upon repetition of the series of operations described above, one robot 22 can perform assembly of a plurality of (seven in this embodiment) parts. In the above description, the first camera 26 for checking the interior of the pallet P checks the position of a part to be picked up in the next cycle. Immediately after the last part of the pallet P is picked up and the pallet becomes empty, since it takes a relatively long time to replace the old pallet P with a new pallet P, no image fetching operation can be performed, and the pallets are replaced until the next cycle is started. Thus, the position of a part to be picked up may be checked immediately before the next part is picked up.

Description of Visual Checking Operation

Figure 8B:
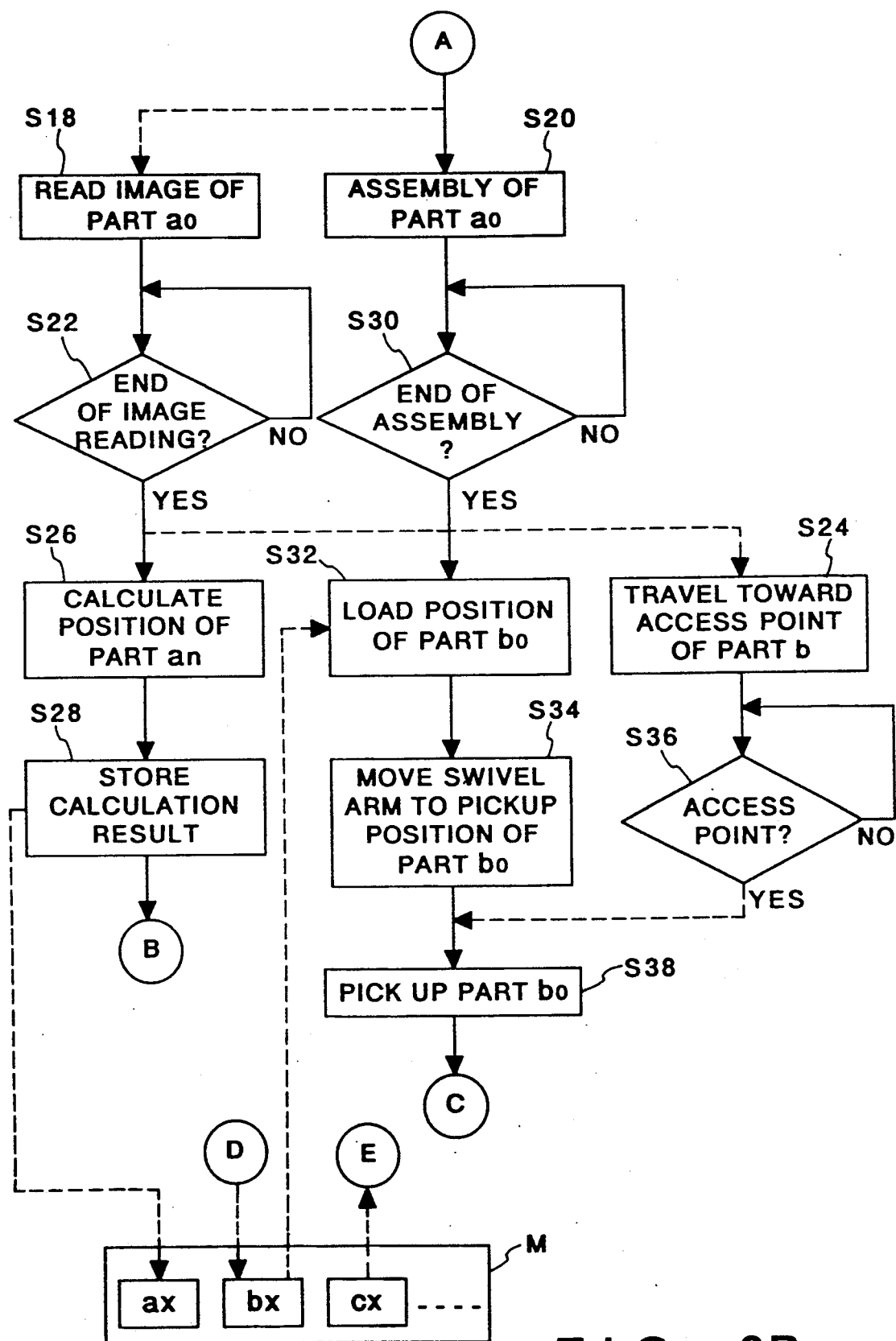
Figure 8C:
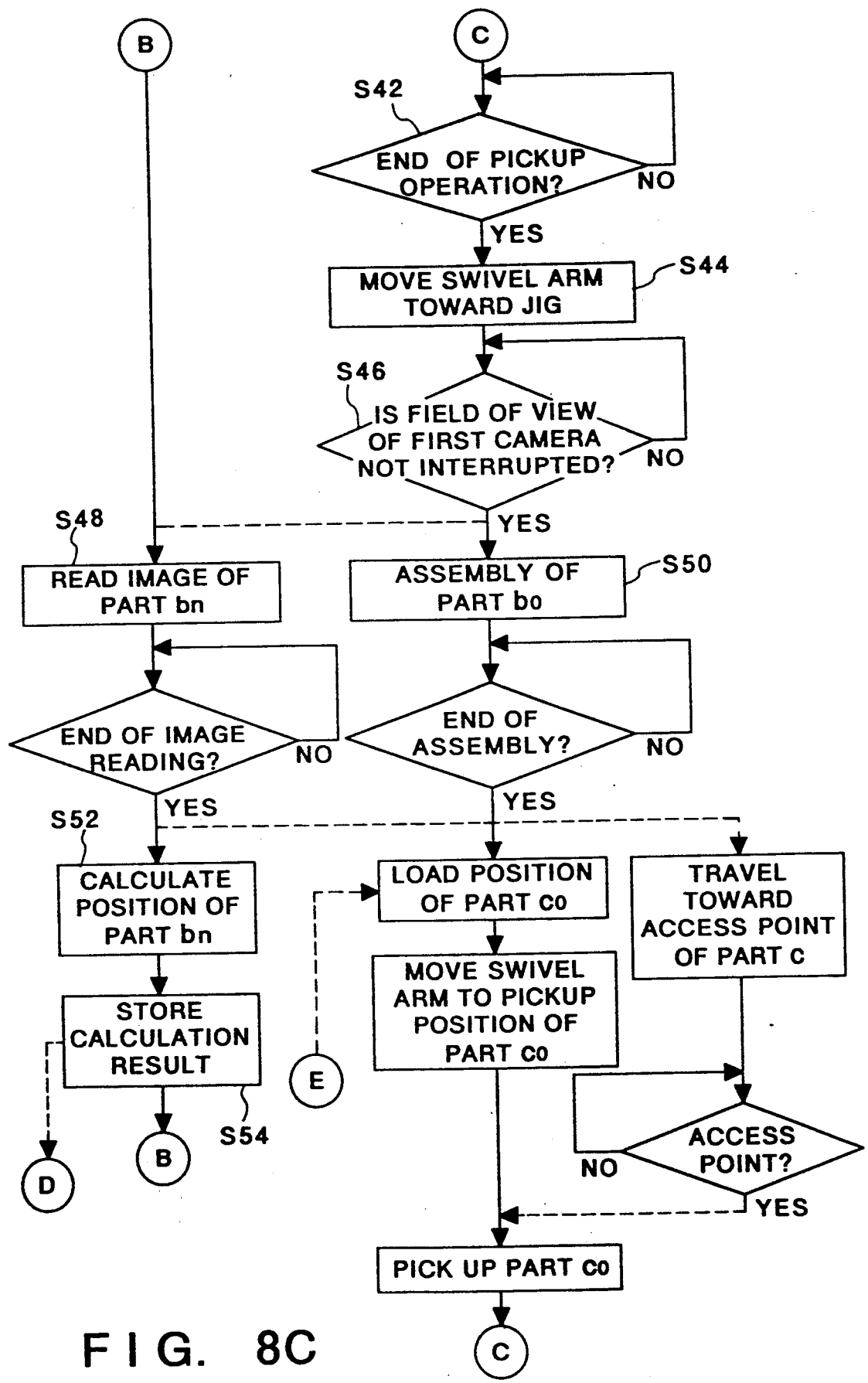

A control sequence of the visual checking operation in the control mechanism 28 will be described below with reference to the flow chart shown in FIGS. 8A to 8C. FIGS. 8A to 8C show associated operation control of the robot 22 and shuttle 20 as well as the visual checking operation.

In the following description, various parts are represented by reference symbols a, b, c, d, . . . , currently assembled parts are designated by reference symbols $a_0$, $b_0$, $c_0$, $d_0$, . . . , and parts to be picked up in the next cycle are designated by $a_n$, $b_n$, $c_n$, $d_n$, . . . .

When the robot 22 picks up a part $a_0$ in step S10, a sensor arranged in the finger unit 32 of the robot 22 checks completion of the pickup operation in step S12. In step S14, the swivel arm 36 is moved toward the assembly jig 24 to assemble the picked up part $a_0$. If it is detected and recognized by the rotary encoder (not shown) incorporated in the driving motor for driving the swivel arm 36 in step S16 that the swivel arm 36 is moved toward the jig 24 and reaches a position where it does not interrupt the field of view of the first camera 26, the first camera 26 receives in step S18 an image of a part $a_n$ to be picked up by the robot 22 in the next cycle on the pellet P.

On the other hand, in parallel with step S18, in step S20, the robot 22 starts assembly of the part $a_0$ on the assembly jig 24.

After the image receiving operation in step S18 is started, if completion of the image receiving operation of the part $a_n$ is detected in step S22, the shuttle 20 immediately begins to move in step S24 toward a part b to be accessed next. In parallel with step S24, in step S26, the position of the part $a_n$ is calculated based on the image information received in step S18.

In this calculation, the received image information of the part $a_n$ is stored in the image memory in the image processing unit of the control mechanism 28, and the image processing unit causes an image processing CPU to execute image processing and conversion processing to a robot coordinate system until the robot picks up the part $a_n$ in the next cycle. Upon completion of the calculation processing in step S26, the calculated data is stored in a parts position data storage section ax of a parts position data memory M in the image processing unit.

The robot 22 executes assembly of the part a in step S20 described above. If completion of the assembly is determined in step S30, position data of a part $b_0$ to be picked up next is loaded from the above-mentioned parts position data memory M in step S32, and movement of the swivel arm 36 is started based on the loaded position data in step S34.

In synchronism with step S34, in the shuttle 20, it is checked in step S36 if movement of the shuttle 20 to an access point of the part $b_0$ is completed. If completion of movement is determined in step S36, the robot 22 executes the pickup operation of the part $b_0$ in step S38.

Basically, the control operations in steps S10 to S38 are repetitively executed. When the robot 22 picks up the part $b_0$ in step S38 and completion of the pickup operation of the part $b_0$ is detected in step S42, the swivel arm 36 is moved toward the jig 24 in step S44. If it is detected that the swivel arm 36 leaves a position above the pallet P upon this movement, the first camera 26 receives an image of a part $b_n$ to be picked up by the robot 22 in the next cycle in step S48, and at the same time, assembly of the part $b_0$ is executed in step S50.

In step S52, image processing and conversion processing to a robot coordinate system is executed until the robot 22 picks up the part $b_n$ in the next cycle. In step S54, the position data of the part $b_n$ to be picked up next is stored in a parts position data storage section bx of the parts position data memory M.

The buffer mechanisms 4 ($4_1$, $4_2$, $4_3$) will be described below with reference to FIGS. 9 to 12. Each buffer mechanism transfers a predetermined assembly from a jig mounting guide 68 on a predetermined shuttle 20 to a jig mounting guide 68 of the next shuttle 20 in units of the jig trays T, and absorbs a difference in assembly speeds of the robots of these shuttles 20, thereby setting a maximum assembly speed of each robot 22.

In the following description, these buffer mechanisms $4_1$, $4_2$, and $4_3$ have the same arrangement, and are represented by reference numeral 4. An automatic assembly unit 10 which delivers the jig tray T on which an assembly is placed is represented by adding a suffix "a", and an automatic assembly unit 10 which receives the jig tray T is represented by adding a suffix "b".

Figure 9:
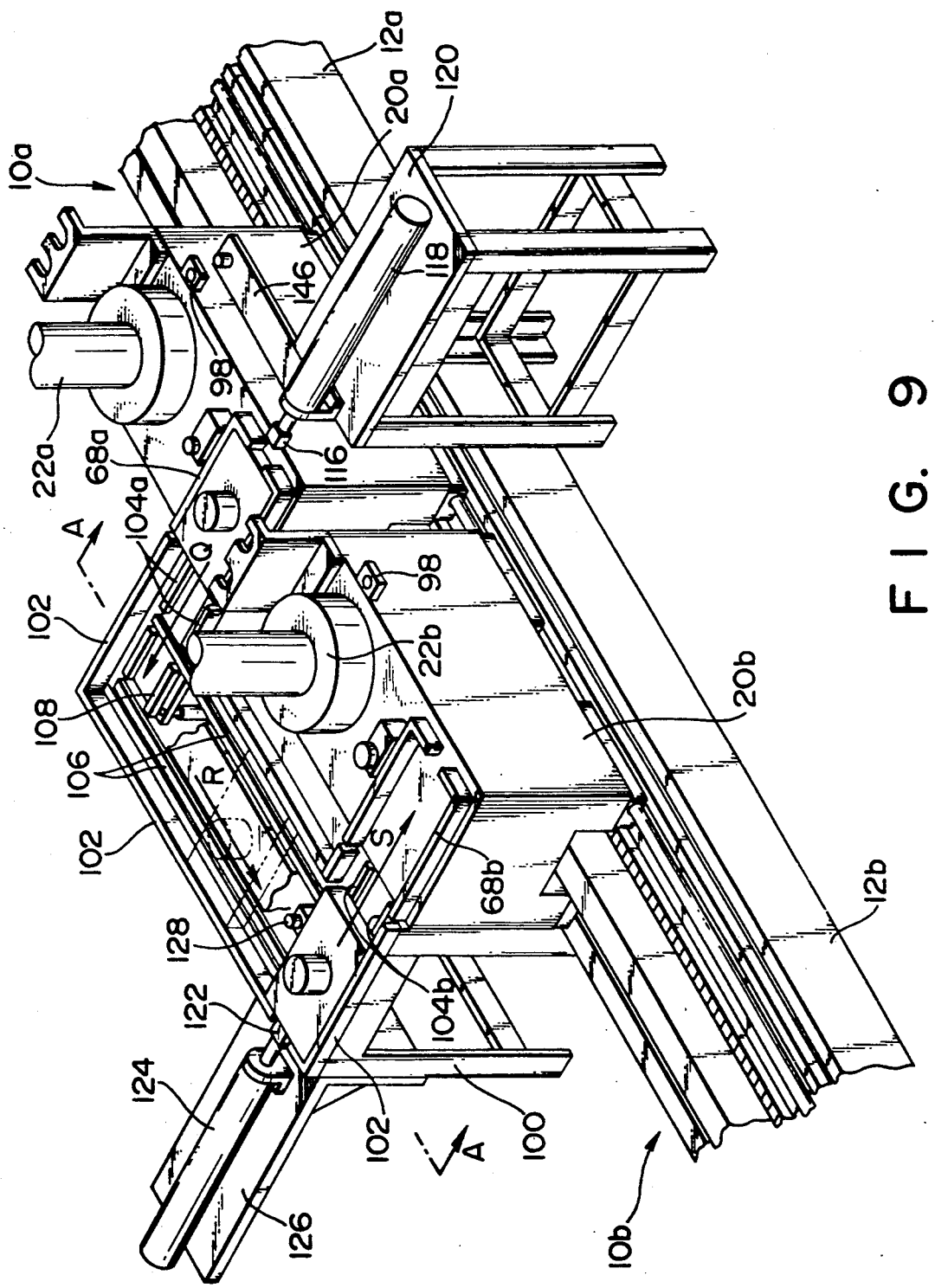
FIGS. 9 and 10 are respectively a perspective view and a plan view showing the arrangement of a buffer mechanism.
Figure 10:
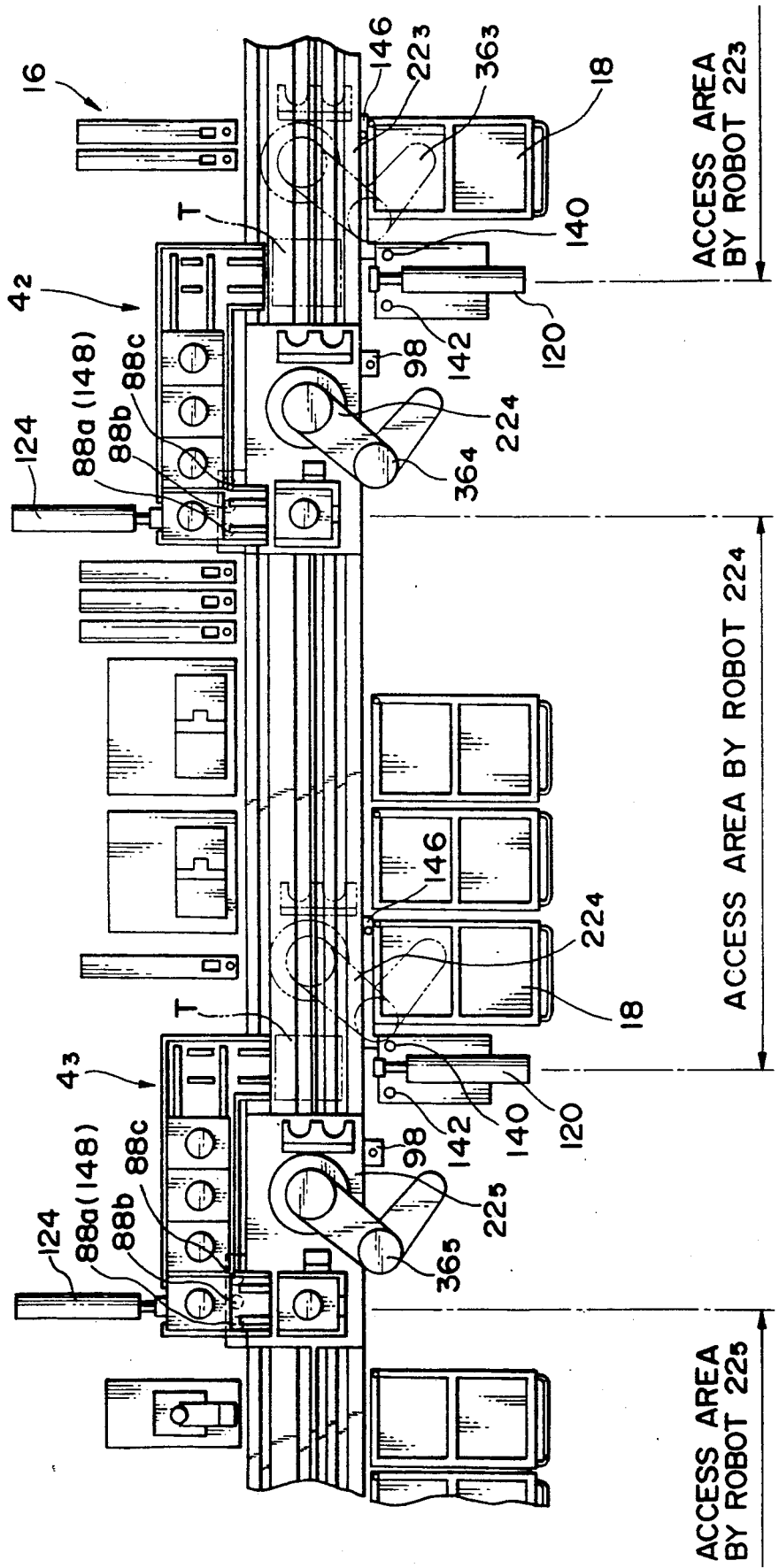

As shown in FIGS. 9 and 10, the buffer mechanism 4 comprises a mounting base 100. The mounting base 100 extends between the terminal end portion of the travel range of a shuttle 20a in an automatic assembly unit 10a which transfers the jig tray T and the starting end portion of the travel range of a shuttle 20b of an automatic assembly unit 10b which receives the jig tray T, and is located on one side of a shuttle base 12 (a combination of shuttle bases 12a and 12b). The mounting base 100 is formed to have a U shape when viewed from the top. One end of the mounting base 100 opposes the terminal end portion of the travel range of the shuttle 20a, the other end thereof opposes the starting end portion of the travel range of the shuttle 20b, and a middle portion thereof extends substantially parallel to the shuttle base 12.

Guide members 102 stand upright on the respective edge portions of the upper surface of the mounting base 100. The guide members 102 are used to guide the side surface of the jig tray T received from the shuttle 20a and to transfer it to the shuttle 20b via a U-shaped convey path. A pair of reception rails 104a for receiving the jig tray T delivered from the shuttle 20a are mounted on the one end portion of the mounting base 100. The heights of these reception rails 104a are defined so that the jig tray T can be received at the same level as the jig mounting guide 68a on the shuttle 20a.

A pair of delivery rails 104b for delivering the jig tray to the jig mounting guide 68b of the shuttle 20b are placed on the other end of the mounting base 100. The heights of these delivery rails 104b are defined so that the jig tray T can be delivered to the jig mounting guide 68b at the same level as the guide 68b.

A pair of travel belts 106 separated from each other at an interval slightly smaller than the width of the jig tray T are endlessly wound in the middle portion of the mounting base 100 so that their end portions respectively oppose the reception and delivery rails 104a and 104b. A convey distance of the jig tray T by these travel belts 106 is defined so that five jig trays T can be present. The upper side of each travel belt 106 is driven by a driving mechanism (not shown) to travel along a direction of an arrow R (the same direction as the travel direction during assembly in robots 22a and 22b). The height of the upper side of each travel belt 106 is set to be slightly lower than those of the reception and delivery belts 104a and 104b.

Figure 12:
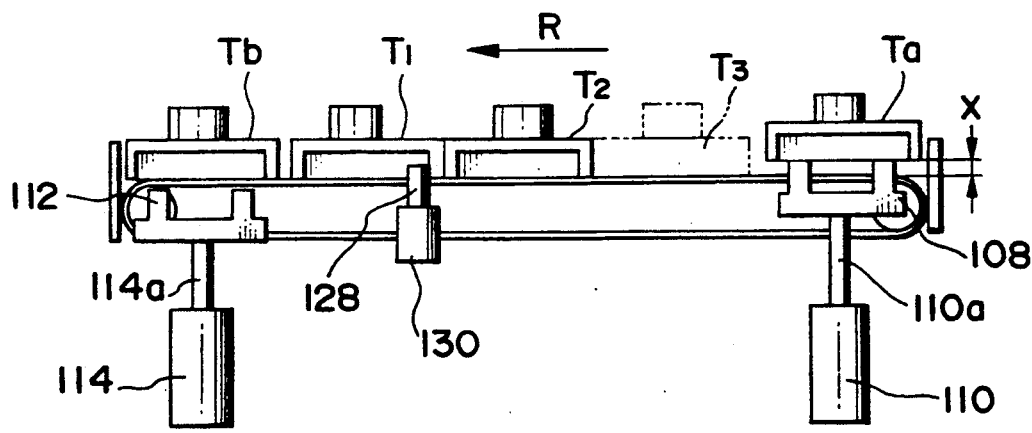
FIG. 12 is a front view of the buffer mechanism.

A vertically movable reception lifter 108 is disposed between the pair of travel belts 106 at the end portion opposing the reception rails 104a. The reception lifter 108 is connected to an actuator 110a of a first lift cylinder 110, as shown in FIG. 12. When the jig tray T is received through the reception rails 104a, the cylinder 110 moves the actuator 110a upward to the same level as the reception rails 104a. When the jig tray T is conveyed in the direction of the arrow R by the travel belts 106, the cylinder 110 moves the actuator 110a downward to the level slightly lower than that of the reception rails 104a.

As shown in FIG. 12, a vertically movable delivery lifter 112 is disposed between the pair of travel belts 106 at the end portion opposing the delivery rails 104b. The delivery lifter 112 is connected to an actuator 114a of a second lift cylinder 114. When the jig tray T is delivered to the jig mounting guide 68b on the shuttle 20b via the delivery rails 104b, the cylinder 114 moves the actuator 114a upward to the same level as the delivery rails 104b. When the travel belts 106 are allowed to load the jig tray T in the direction of the arrow R, the cylinder 114 moves the actuator 114a downward to the level slightly lower than that of the delivery rails 104b.

The buffer mechanism 4 comprises a reception pusher 116, as shown in FIGS. 9 and 10. The reception pusher 116 is disposed to face the shuttle 20a which travels to and is stopped at the terminal end portion. The pusher 116 is brought into contact with the jig tray T in the jig mounting guide 68a to push out the tray T from the jig mounting guide 68a, and then conveys it to the proximal end portion of the travel belts 106 via the reception rails 104a in a direction of an arrow Q.

The reception pusher 116 is fixed to the distal end of a piston rod 118a of a reception cylinder 118 for driving the reception pusher. The piston rod 118a of the reception cylinder 118 is retracted to a position where it is pulled out sideways (in a direction opposite to the reception direction Q) from the jig mounting guide 68a in a standby state. When the reception operation of the jig tray T is started, the cylinder 118 pushes out its piston rod 118a in the reception direction Q.

Note that the reception cylinder 118 is placed on a first table 120 arranged beside the shuttle base 12 opposite to the position of the mounting base 100. The first table 120 is fixed to the side surface of the shuttle base 12.

The buffer mechanism 4 also comprises a delivery pusher 122. The delivery pusher 122 is arranged to face the shuttle 20b which is returned to and stopped at the starting end portion. The pusher 122 is brought into contact with the jig tray T conveyed to the far end portion of the pair of travel belts 116 opposing the delivery rails 104b to push the tray T therefrom, and conveys the tray T to the jig mounting guide 68b on the shuttle 20b via the delivery rails 104b in a delivery direction indicated by an arrow S.

The delivery pusher 122 is fixed to the distal end of a piston rod 124a of a delivery cylinder 124 for driving the delivery pusher. The piston rod 124a of the delivery cylinder 124 is retracted to a position where it is pulled out sideways (in a direction opposite to the delivery direction S) from the travel rails 106 in a standby state. When the delivery operation of the jig tray T is started, the cylinder 124 pushes out its piston rod 124a in the delivery direction S.

Note that the delivery cylinder 124 is placed on a second table 126 fixed beside the mounting base 100.

As shown in FIG. 9, a stopper 128 is arranged. The stopper 128 engages with the jig tray T which is conveyed upon travel of the travel belts 106 to stop conveyance of the tray T. More specifically, as shown in FIG. 12, the stopper 128 is disposed at a position where the stopper 128 is engaged with an upstream end face in the convey direction Q of a recess formed in the lower surface of a jig tray T which is conveyed to an immediately upstream side in the convey direction R of a jig tray T which is conveyed and stopped at the far end portion of the travel belts 106 upon travel of the travel belts 106, and temporarily stops conveyance of this jig tray T regardless of travel of the travel belts 106.

In the following description, reference symbol $T_a$ designates a jig tray at a reception position; $T_1$, a jig tray at a first standby position; $T_2$, a jig tray at a second standby position; $T_3$, a jig tray at a third standby position; $T_b$, a jig tray at a delivery position.

The stopper member 128 is fixed to the distal end of a piston rod 130a of a stopper cylinder 130 for driving the stopper member. When no jig tray $T_b$ is present at the delivery position, the stopper cylinder 130 retracts its piston rod 130a downward to allow conveyance of the jig tray $T_1$ from the first standby position to the delivery position. When the jig tray $T_b$ is present at the delivery position, the cylinder 130 pushes up its piston rod 130a to lock conveyance of the jig tray $T_1$ from the first standby position to the delivery position.

Figure 11:
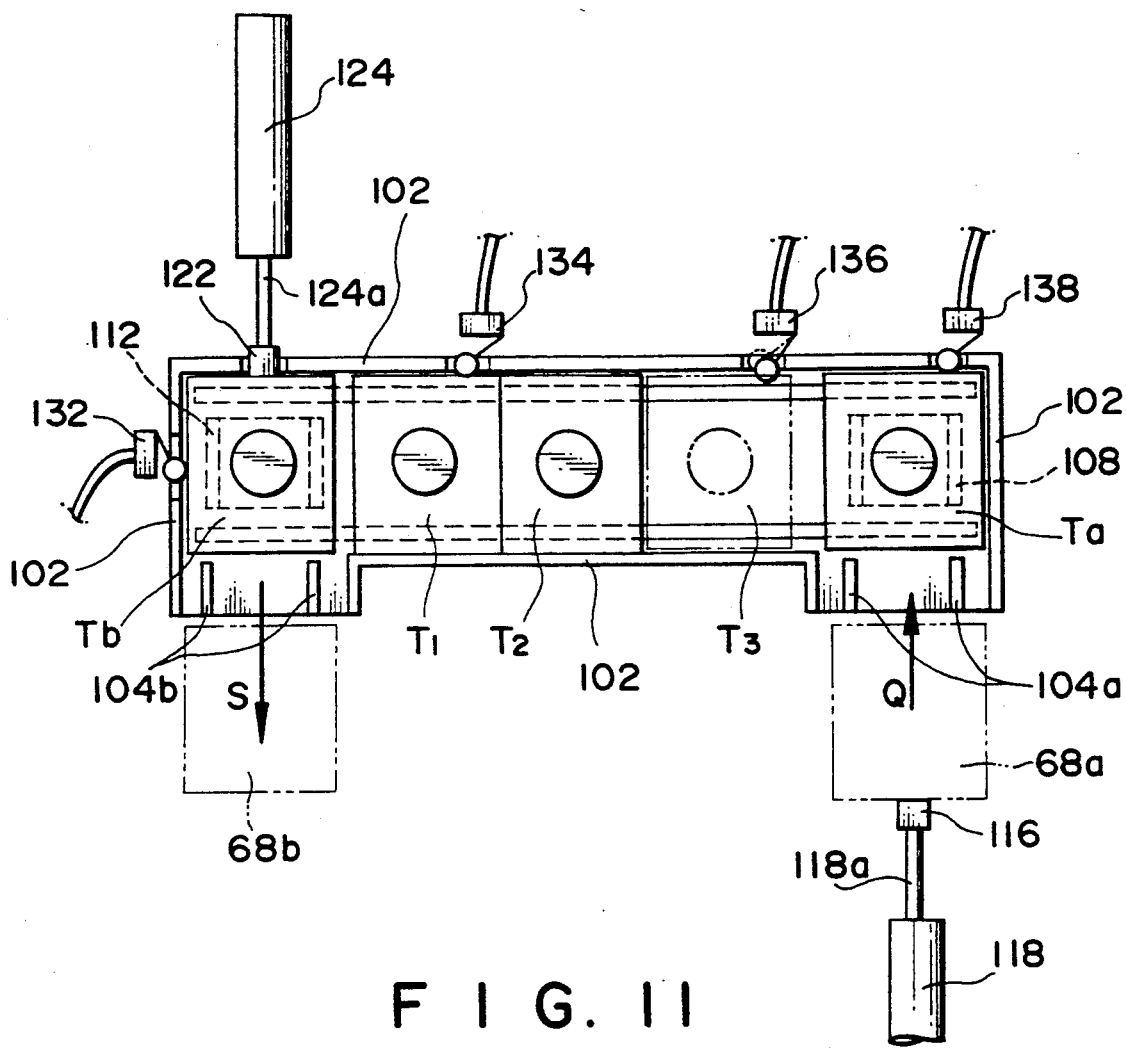
FIG. 11 is a plan view showing in detail the buffer mechanism.

As shown in FIG. 11, a delivery tray sensor 132 is disposed on the guide member 102 on the mounting base 100. The delivery tray sensor 132 is turned on by the jig tray $T_b$ conveyed to the delivery position. When the delivery tray sensor 132 is turned on, the second lift cylinder 114 is operated to push up the delivery lifter 112, so that the tray $T_b$ at the delivery position is lifted to be separated from the travel belts 106. When a delivery signal is output to enable the delivery cylinder 124, the jig tray $T_b$ is immediately pushed out from the delivery position toward the next shuttle 20b.

When the delivery tray sensor 132 is turned off and an internal sensor (not shown) detects return of the delivery cylinder 124, the second lift cylinder 114 is operated to move the delivery lifter 112 downward to the level lower than the travel belts 116. In this manner, when the delivery lifter 112 is moved downward, the next jig tray $T_1$ can be allowed to be conveyed to the delivery position.

A standby tray sensor 134 is disposed on the guide member 102. The standby tray sensor 134 is turned on by the jig tray $T_1$ which is conveyed to the first standby position. In a state wherein the above-mentioned delivery tray sensor 132 is turned on, after the lapse of a predetermined period of time after the standby tray sensor 134 is turned on, the stopper cylinder 130 described above is driven, and pushes out the stopper member 128 to the locking position, thereby locking the jig tray $T_1$ conveyed to the first standby position.

The stopper cylinder 130 is operated to return the stopper member 128 to its retracted position after the delivery tray sensor 132 is turned off, and the delivery lifter 112 is moved downward to the level lower than that of the travel belts 106. In this manner, when the stopper member 128 is returned to the retracted position, the jig tray $T_1$ at the first standby position begins to be conveyed toward the delivery position.

A full sensor 136 is arranged on the guide member 102. The full sensor 136 is turned on by the third jig tray $T_3$ which is conveyed onto the travel belts 106 and stands by to be adjacent to the immediately preceding tray T, as shown in FIG. 11. When the full sensor 136 is turned on, this means that no more jig trays T can stand by on the travel belts 106. Thus, the operation of the reception lifter 108 is inhibited to inhibit any more jig trays T from placing on the travel belts 106.

A reception sensor 138 is arranged on the guide member 102. The reception sensor 138 is turned on by the jig tray $T_a$ which is pushed out to the reception position. When the reception sensor 138 is turned on, the first lift cylinder 110 is operated to push down the reception lifter 108, thereby placing the jig tray $T_a$ pushed out to the reception position onto the travel belts 106. In this manner, upon travel of the travel belts 106, the jig trays T placed on the travel belts 106 can be conveyed toward the delivery position.

Note that the first lift cylinder 110 is operated to push up the reception lifter 108 to a position projecting from the travel belts 106 after the lapse of a predetermined period of time after the reception sensor 138 is turned off. When the reception lifter 108 is pushed up in this manner, a new jig tray T from the shuttle 20a can be received.

A tray exhaust start switch 140 is mounted on the first table 120 on which the reception cylinder 118 is mounted. The tray exhaust start switch 140 starts a reception operation, in other words, starts an exhaust operation of a tray T from the shuttle 20a. In addition, a tray loading start switch 142 is mounted on the first table 120. The tray loading start switch 142 starts a delivery operation, in other words, starts a loading operation of trays T to the shuttle 20b. The tray exhaust start switch 140 is turned on by the delivery robot 22a, and the tray loading start switch 142 is turned on by the reception robot 22b.

As shown in FIG. 10, a reception operation end signal lamp 146 is arranged sideways relative to the first table at a position where the delivery shuttle 20a which is stopped at the delivery position faces the above-mentioned light-receiving element 98 from the above. A delivery operation end signal lamp 148 is arranged on the lower surface of the delivery rail 104b at a position where the reception shuttle 20b which is stopped at a reception position faces the above-mentioned light-receiving element 88a from the above. These signal lamps 146 and 148 are connected to a buffer control mechanism 144, and their ON states are controlled.

When the reception operation of the jig trays T from the shuttle 20a is completed, i.e., when a sensor (not shown) detects that the reception pusher 116 is completely returned to the standby position to set a reception standby state and the shuttle 20a is enabled to travel, the buffer control mechanism 144 turns on the reception operation end signal lamp 146. Meanwhile, the control mechanism 28 of the shuttle 20a detects the ON state of the reception operation end signal lamp 146 through the light-receiving element 98, and starts execution of a control operation for returning the shuttle 20a to an assembly start position.

When the delivery operation of jig trays T from the shuttle 20b at the reception position by the delivery cylinder 124 is completed, i.e., when a sensor (not shown) detects that the delivery pusher 122 is completely returned to the standby position to set a delivery standby state and the shuttle 20b is enabled to travel, the buffer control mechanism 144 turns on the delivery operation end signal lamp 148. The control mechanism 28 of the shuttle 20b detects the ON state of the delivery operation end signal lamp 148 via the light-receiving element 88a, and executes a control operation for starting assembly on the shuttle 20b.

In this manner, in the buffer mechanism 4 for receiving the jig trays T from the shuttle 20a, and delivering them to the next shuttle 20b, setup completion information of reception and delivery standby states can be sent to the corresponding shuttles 20a and 20b by means of the reception and delivery operation end signal lamps 146 and 148, and no connections of wirings for communication are required, thus simplifying an arrangement.

The control operations of the constituting elements of the buffer mechanism 4 are defined by the buffer control mechanism 144. The driving mechanism for driving the convey belts 106 is driven to travel the travel belts 106 at a predetermined speed upon power-on. The predetermined speed is set such that in the two automatic assembly units 10a and 10b coupled by the buffer mechanism 4, a transfer operation can be completed within a time shorter than a minimum cycle time determined by maximum assembly speeds of the robots 22a and 22b.

Figure 13A:
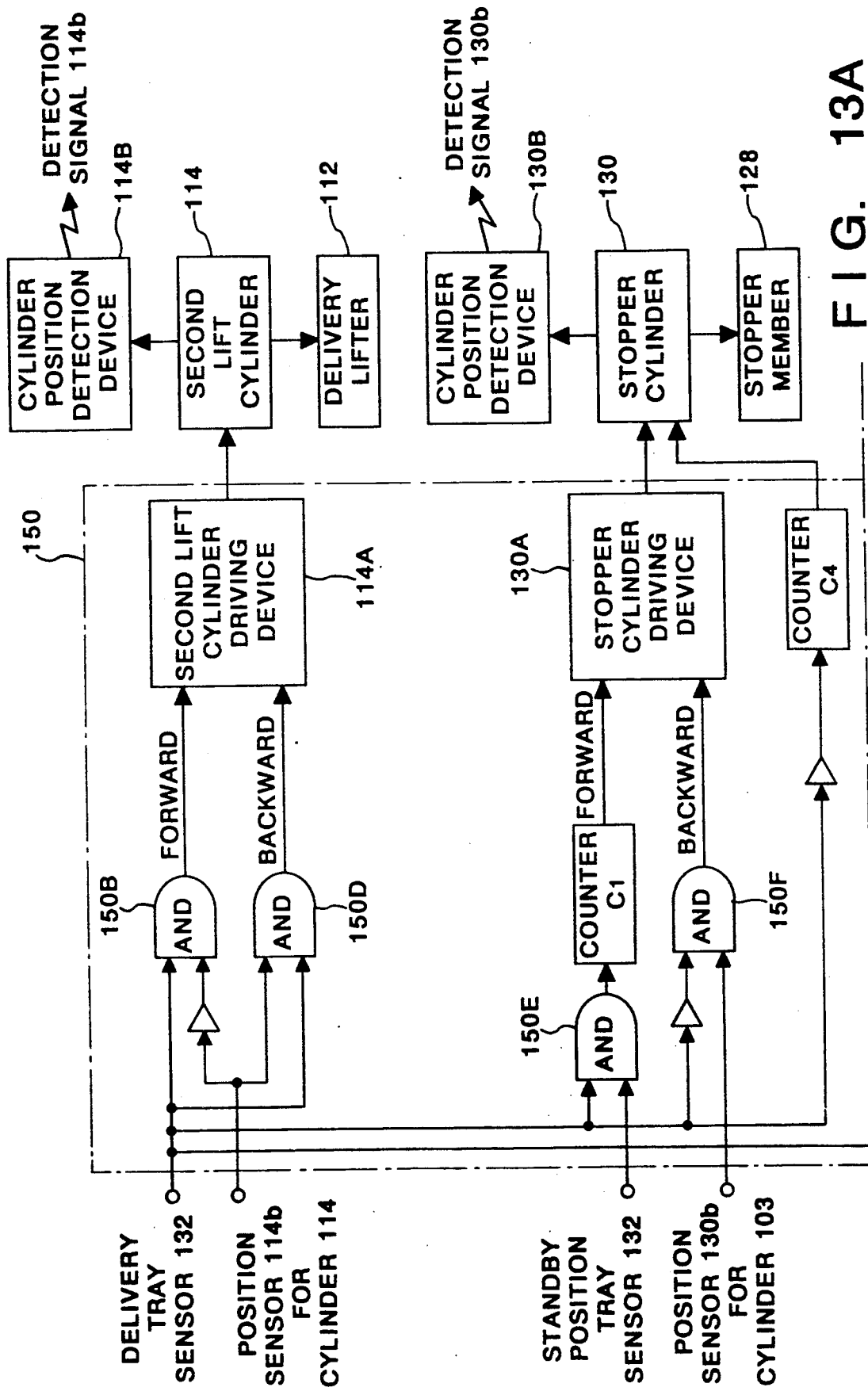
FIGS. 13A to 13C are block diagrams showing the arrangement of the control mechanism for controlling the buffer mechanism.

The basic operation of the buffer mechanism 4 will be described below with reference to the block diagram of FIGS. 13A to 13C, and the flow charts of FIGS. 14A(a) and 14A(b).

In a controller 150 of the buffer mechanism 4, in an initial state wherein no jig tray T is present on a buffer tray convey device (i.e., the pair of travel belts 106), the reception sensor 138 is kept off. The OFF signal of the sensor 138 is input to a counter $C_2$ through an inverter, thereby enabling the counter $C_2$. After a count operation by the counter $C_2$ is completed, a count end signal is output to a driving device 110A for the first lift cylinder 110 to drive it. According to the operation of the first lift cylinder 110, the first lift cylinder 110 pushes up the reception lifter 108 to a level position higher than that of the travel belts 106. In this manner, a reception standby state at the reception position is set.

When a predetermined assembly operation is finished in the delivery automatic assembly unit 10a, the shuttle 20a is stopped at the terminal end portion of the shuttle base 12a (i.e., the terminal end portion of the travel range), and the robot 22a carried on the shuttle 20a turns on the tray exhaust start switch 140 via its finger unit 32 upon reception of an assembly end signal from the robot 22a, thereby starting the reception operation (step S101).

More specifically, when the tray exhaust start switch 140 is turned on, an ON signal of this switch 140 and an OFF signal of the reception sensor 138 are input to a first logic circuit 150A, and a high-level signal from the logic circuit 150A is input to a driving device 118A for the reception cylinder 118. Upon input of the high-level signal, the driving device 118A drives the reception cylinder 118 to push out the reception pusher 116 in the reception direction Q. In this manner, the jig tray $T_a$ is pushed out from the jig mounting guide 68 on the shuttle 20a. As a result, the jig tray $T_a$ is transferred onto the reception lifter 108 via the reception rails 104a (step S102).

When the jig tray $T_a$ is carried on the reception lifter 108 and is pushed by the reception pusher 116 to be transferred to a correct reception position where the sensor 138 is operated, the sensor 138 is turned on, thus completing the reception operation (step S103).

In response to an ON signal from the reception sensor 138, the first lift cylinder 110 moves the reception lifter 108 downward by the lift cylinder driving device 110A. As a result, the jig tray $T_a$ is placed on the traveling travel belts 106, and is conveyed toward the delivery position in the travel direction R upon travel of the travel belts 106 (step S104).

The pair of belts 106 as the buffer convey device are caused to travel by a driving device (not shown), and may be started to be interlocked with an ON operation of the tray exhaust start switch 140 or may be kept driven in advance.

When the jig tray $T_a$ is conveyed from the reception position and the reception sensor 138 is turned off, the counter $C_2$ measures a predetermined period of time, so that the first lift cylinder 110 pushes up the reception lifter 108, as described above, thus setting the reception standby state at the reception position again (step S105).

In the operation of the first lift cylinder 110 in step S105, the reception operation end signal lamp 146 is turned on through a reception operation end signal generator 146A in response to a signal from a detection device 110B for detecting a moving position of the first lift cylinder 110, and a return operation of the shuttle 20a to the assembly start position, i.e., to the starting end is enabled (step S106).

When no jig tray $T_b$ stands by at the delivery position, i.e., when the delivery sensor 132, the standby tray sensor 134, and the full sensor 136 are kept off, a reception standby state for the delivery position is set at the delivery position. In the reception standby state for the delivery position, the second lift cylinder 114 pushes down the delivery lifter 112 to a level position lower than the travel belts 106, and the delivery cylinder 124 sets the pusher 112 to be retracted from the delivery position (step S107).

In this manner, the jig tray $T_a$ is conveyed to the delivery position in the reception standby state. When the jig tray $T_a$ reaches the delivery position, the delivery tray sensor 132 is turned on (step S108).

A detection device 114B for detecting a moving position of the second lift cylinder 114 is connected to the cylinder 114. A second logic circuit 150B receives an ON signal from the delivery tray sensor 132 and a signal obtained by inverting an OFF signal (when the second lift cylinder 114 is in a push-down state, the detection device outputs the OFF signal) from the detection device 114B by an inverter. Thus, the second logic circuit 150B outputs a high-level signal. Upon reception of the high-level signal, a driving device 114A drives the second lift cylinder 114 to push up the delivery lifter 112 As a result, the jig tray $T_b$ at the delivery position is lifted upward to a level position higher than the travel belts 106 (step S109).

In this state, a delivery standby state at the delivery position is set.

In the delivery standby state in step S109 described above, the second lift cylinder 114 is driven, and a detection signal 114b is output from the cylinder position detection device 114B.

The reception robot 22b discriminates the presence/absence of the detection signal 114b (step S110), and this reception robot 22b turns on the tray loading start switch 142, thereby starting the delivery operation (step S111).

In this delivery operation, an ON signal from the tray loading start switch 142 is input to a delivery cylinder driving device 124A. Thus, the delivery cylinder 124 is driven to push out the delivery pusher 122 in the delivery direction S (step S112). Upon this push-out operation, the jig tray $T_b$ at the delivery position is conveyed to and set on the jig mounting guide 68b on the delivery shuttle 20b via the delivery rails 104b, thus completing delivery operation of one jig tray T (step S113).

When the jig tray $T_b$ is pushed out from the delivery position, the delivery tray sensor 132 is turned off, and the OFF signal and a position detection signal 124b from a cylinder position detection device 124B for the delivery cylinder 124 are input to a third logic circuit 150C. Thus, the third logic circuit 150C outputs a high-level signal. Upon reception of the high-level signal, a driving device 124A drives the delivery cylinder 124 to return the delivery pusher 122 in a direction opposite to the delivery direction.

An inverted signal of an OFF signal from the delivery tray sensor 132 and the signal 114b from the position detection device 114B for the cylinder 114 are input to a fourth logic circuit 150D. Thus, the fourth logic circuit 150D outputs a high-level signal. Upon reception of the high-level signal, the driving device 114A drives the second lift cylinder 114 to move the delivery lifter 112 downward. As a result, the reception standby state at the delivery position is set again (step S113).

As a result, the above-mentioned delivery operation end signal lamp 148 is turned on, thus enabling start of the next assembly on the shuttle 20b (step S115).

In this manner, a series of reception and delivery operations of jig trays T in the buffer mechanism 4 are completed.

Description of Buffer Stock Operation Mode

In a convey operation of a jig tray T from the reception position to the delivery position, when the jig tray $T_b$ stands by at the delivery position, i.e., when the delivery tray sensor 132 is turned on, the buffer stock operation is executed.

Figure 13B:
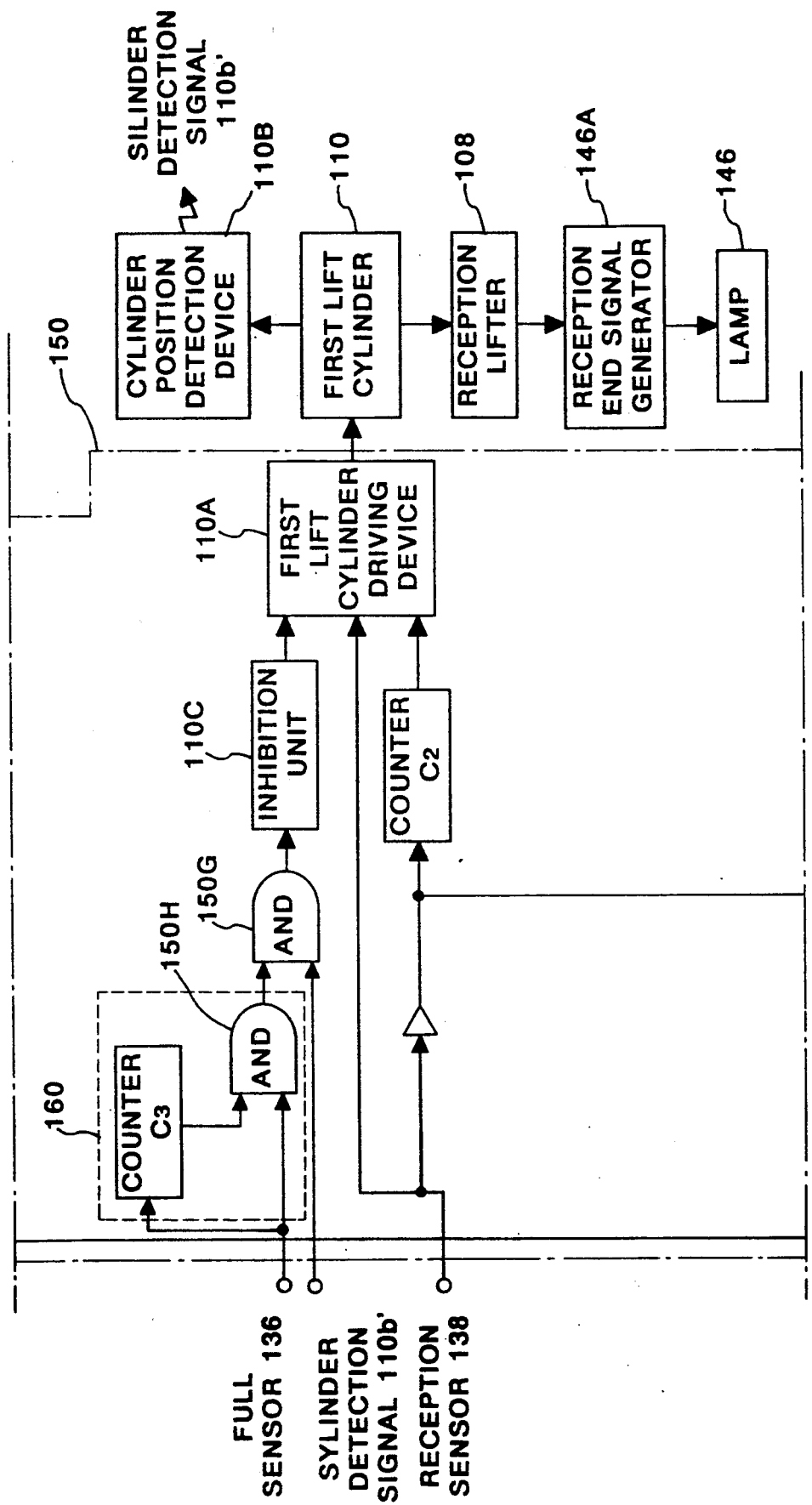
Figure 13C:
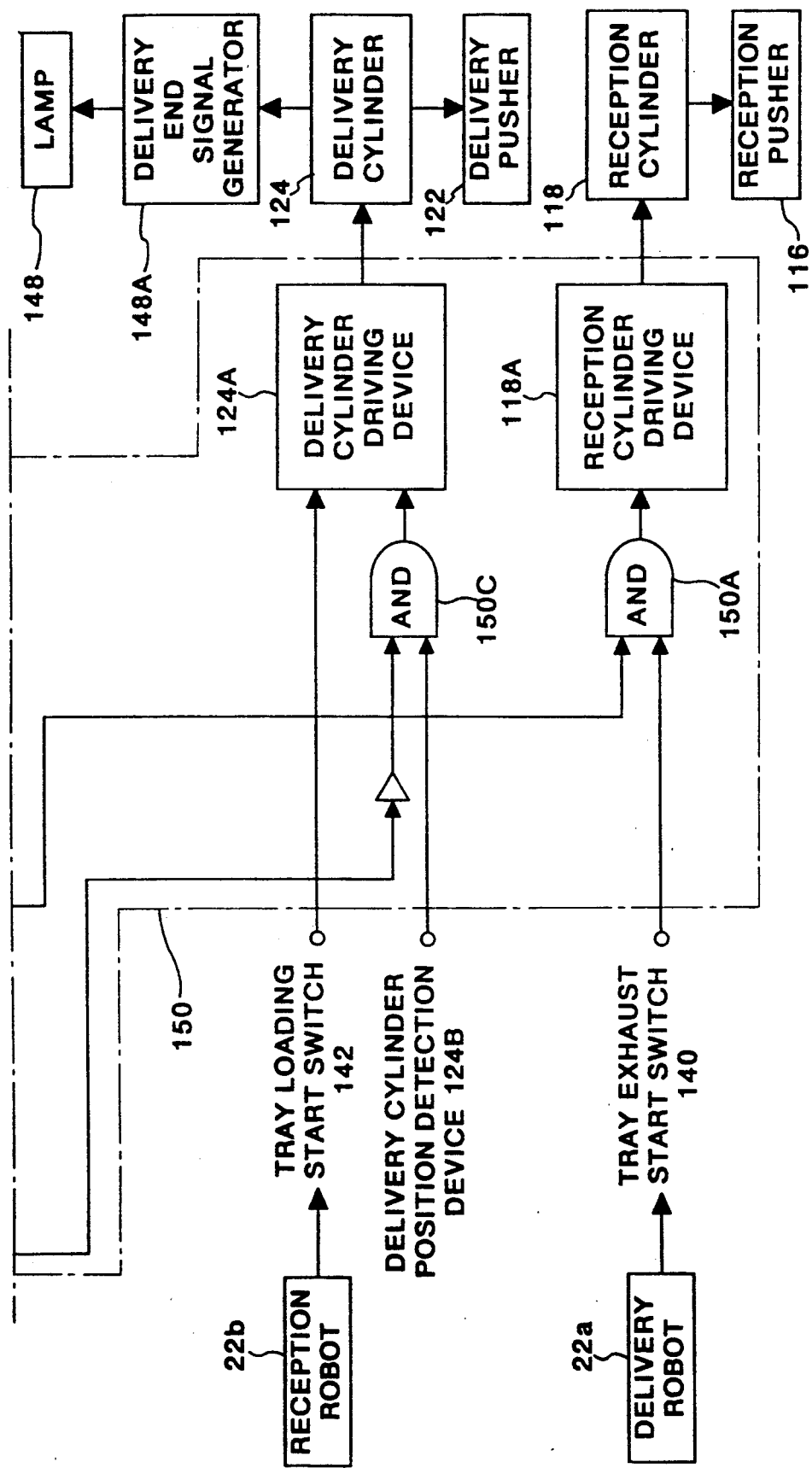
Figure 14A:
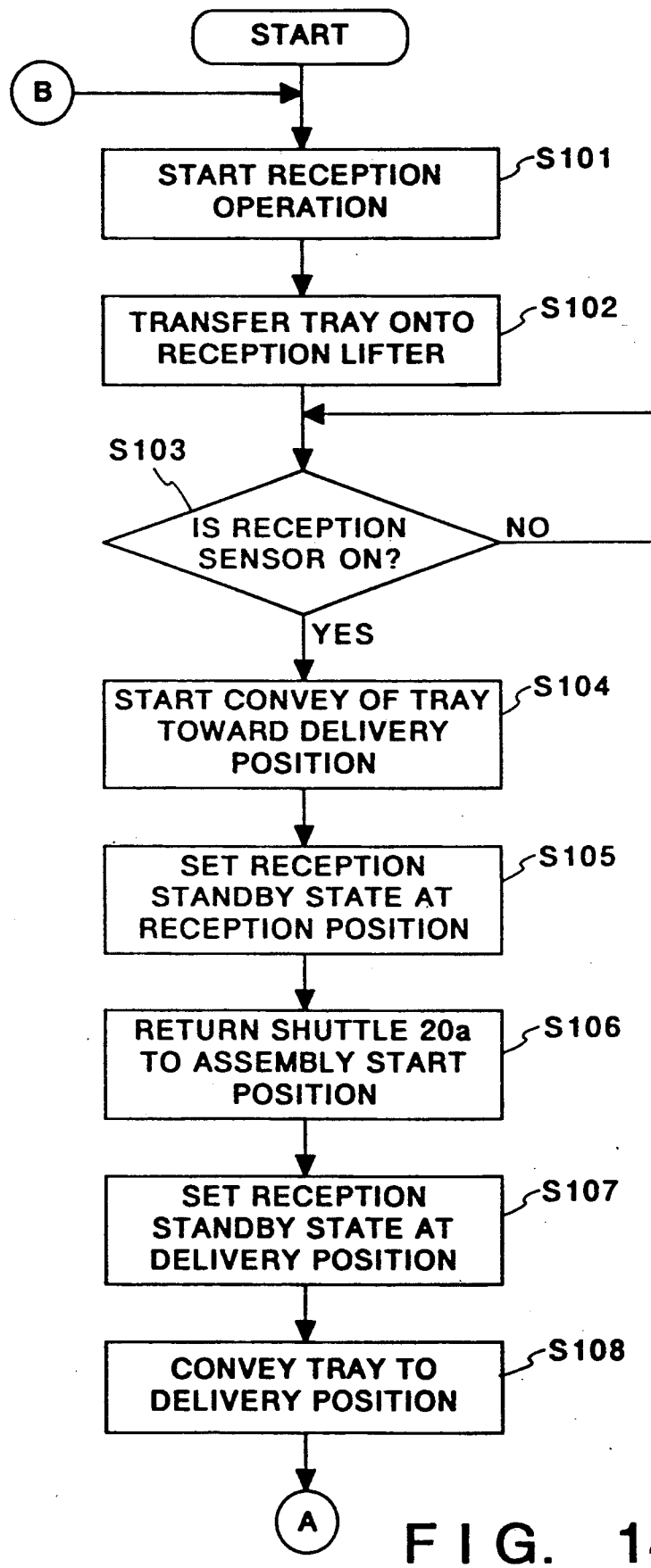
FIGS. 14A(a) and 14A(b) are flow charts showing a control sequence of reception/delivery operations in the buffer mechanism.
Figure 14A:
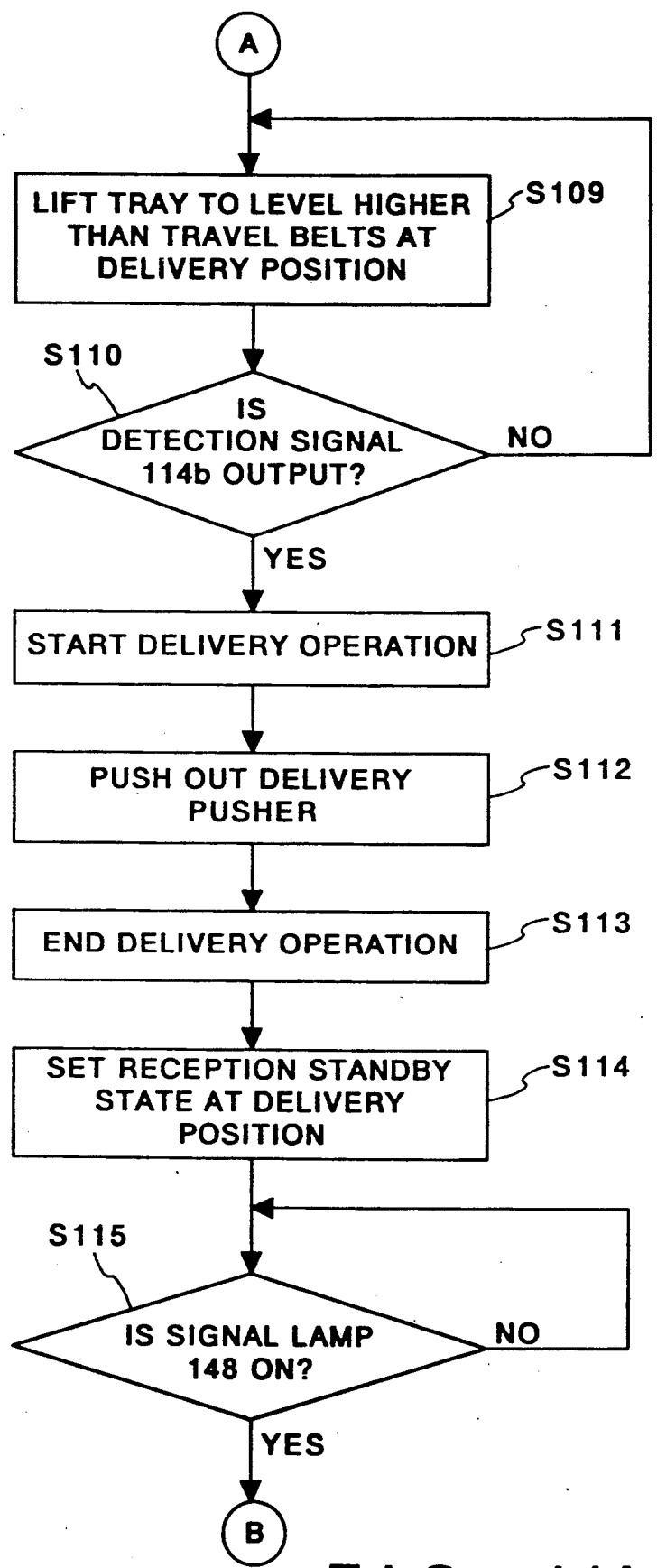
Figure 14B:
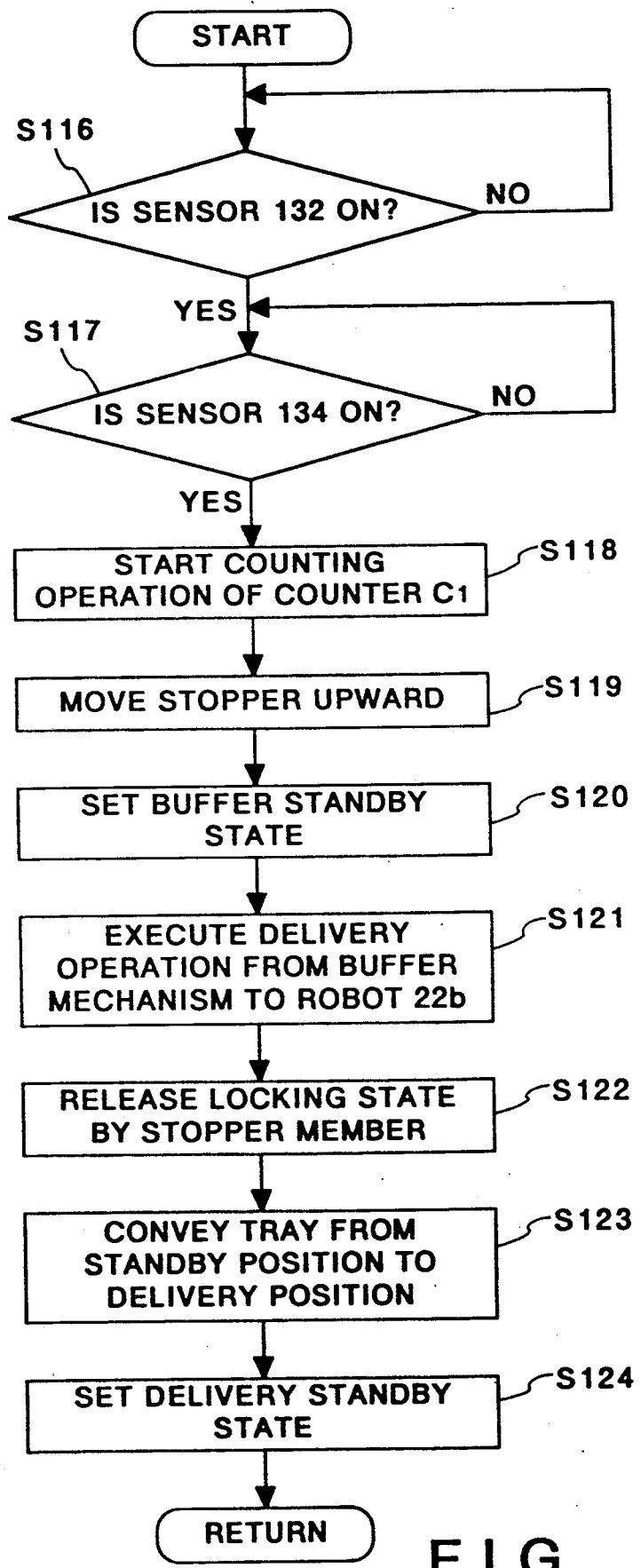
FIG. 14B is a flow chart showing a control sequence in a buffer stock mode in the buffer mechanism.

The buffer stock operation will be described below with reference to the block diagram of FIGS. 13A to 13C and the flow chart of FIG. 14B showing the buffer stock mode.

The ON state of the delivery tray sensor 132 is checked (step S116). The next jig tray T is conveyed on the pair of travel belts 106 of the convey device of the buffer mechanism 4. Thus, the standby tray sensor 134 located on the upstream side of the delivery position is turned on (step S117), and outputs an ON signal. The ON signal from the delivery tray sensor 132 in step S116 and the ON signal from the standby tray sensor 134 are input to a fifth logic circuit 150E. Thus, the fifth logic circuit 150E outputs a high-level signal, thus causing a counter $C_1$ to start a count operation (step S118).

A count end signal from the counter $C_1$ is input to a stopper cylinder driving device 130A, and the stopper cylinder 130 pushes up the stopper member 128 (step S119), thereby locking the jig tray $T_1$ in conveyance immediately before the delivery position. As a result, the jig tray $T_1$ is locked by the stopper member 128 at the first standby position regardless of travel of the travel belts 106. In this manner, the buffer stock operation when the jig tray $T_b$ is left at the delivery position is completed, and a buffer standby state is set (step S120).

A delivery operation of the tray $T_b$ at the delivery position to the second robot 22b is executed in accordance with the buffer delivery operation mode shown in FIGS. 14A($a$) and 14A($b$) (step S121).

When the delivery operation of a tray at the delivery position is performed, the delivery tray sensor 132 is turned off. An inverted signal of the OFF signal from the sensor 132 and a detection signal 130$b$ from a position detection device 130B for the stopper cylinder 130 are input to a sixth logic circuit 150F. Thus, the sixth logic circuit 150F outputs a high-level signal. Upon reception of the high-level signal, the driving device 130A drives the stopper cylinder 130, thereby releasing the locked state of the tray $T_1$ by the stopper member 128 (step S122).

When the locked state by the stopper member 128 is released, the tray $T_1$ at the standby position is conveyed to the delivery position upon travel of the pair of travel belts 106 of the convey device (step S123). Thereafter, the delivery standby state at the delivery position is set as described above (step S124).

Upon conveyance of a jig tray T from the reception position to the delivery position, when the jig tray $T_1$ is in a standby state at the first standby position, the same buffer stock operation described above is executed at the second standby position set at the immediately upstream side of the first standby position. In this case, the second jig tray $T_2$ is brought into contact with the jig tray $T_1$ and is stopped and stands by at the second standby position.

Buffer Full Mode

Figure 14C:
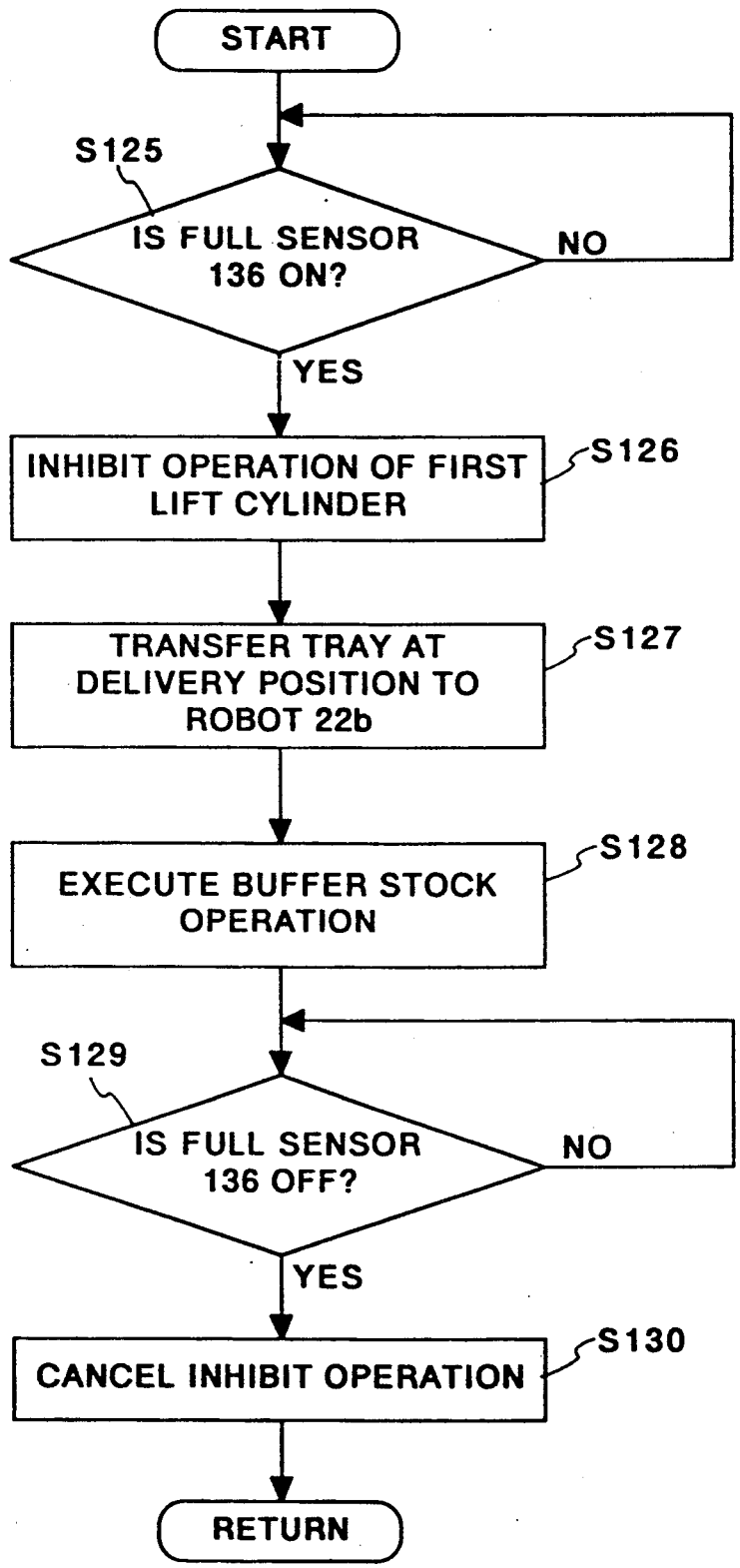
FIG. 14C is a flow chart showing a control sequence in a full mode in the buffer mechanism.

A full mode will be described below with reference to FIGS. 13 and 14C. In this mode, the four trays $T_b$, $T_1$, $T_2$, and $T_3$ sequentially stand by on the pair of travel belts 106 of the convey device of the buffer mechanism 4.

When the convey device becomes full, the full sensor 136 is turned on. When the full sensor 136 is turned on (step S125), the buffer full mode is set to prevent the following buffer stock. As a result, a jig tray $T_a$ is inhibited from being placed on the travel belts 106 in the delivery automatic assembly unit 10a.

When the full sensor 136 is turned on, a counter $C_3$ starts counting. The counter $C_3$ is used to distinguish the full mode of the buffer mechanism 4 from a normal article convey mode set when the buffer is not full.

When the buffer mechanism 4 is not full, an article passes by the full sensor 136 after it turns on the sensor 136 once. Therefore, only when the full sensor 136 outputs an ON signal after the lapse of a passage time of the jig tray T measured by the counter $C_3$, a full checking unit 160 comprising the counter $C_3$ and an eighth logic circuit 150H performs checking.

More specifically, the output signal from the counter $C_3$ and a signal from the full sensor 136 are input to the eighth logic circuit 150H. According to these signal, the eighth logic circuit 150H outputs a high-level signal, thereby detecting a full state.

A full signal from the full checking unit 160 and a cylinder escaped position signal 110$b'$ from the cylinder position detection device of the reception cylinder 110 are input to a seventh logic circuit 150G. Thus, the seventh logic circuit 150G outputs a high-level signal. The high-level signal is input to an inhibition unit 110C for inhibiting the operation of the first lift cylinder 110. The inhibition unit 110C inhibits the operation of the first lift cylinder 110 on the basis of the input high-level signal. In this manner, the operation of the reception lifter 108 is disabled until the inhibition state is released (step S126).

In the reception disabled state of the reception lifter 108, the tray T at the delivery position is transferred to the second robot 22b, as described above with reference to FIGS. 14A($a$) and 14A($b$) (step S127).

Furthermore, after transfer of the tray to the second robot at the delivery position, steps of the buffer stock mode described above with reference to FIG. 14B are executed (step S128). Along with the operation of the buffer stock mode, the tray $T_b$ shown in FIG. 11 is transferred by the travel belts 106 from the delivery position to the second robot; the tray $T_1$, from the first standby position to the delivery position; the tray $T_2$, from the second standby position to the first standby position; and the tray $T_3$, from the third standby position to the second standby position.

When the tray $T_3$ is conveyed from the third standby position to the second standby position, the full sensor 136 is turned off (step S129). The OFF signal from this sensor serves as a signal for canceling the inhibition operation by the inhibition unit 110C. As a result, the inhibition state of the reception lifter 108 is released (step S130).

As described above, the automatic assembly system of the present invention has the buffer mechanism 4 which is arranged between the first and second robots 22a and 22b and comprises the convey device for receiving a plurality of articles from the first robot 22a and delivering them to the second robot 22b. The buffer mechanism 4 comprises a detection device for detecting the presence/absence of an article at an article delivery position. This article is moved from the convey position of the convey device to the delivery position for the second robot 22b on the basis of a signal from the detection device, thereby transferring the article to the second robot 22b. As a result, an article can be conveyed from the reception position to the delivery position of the buffer mechanism 4 regardless of the presence/absence of an article at the delivery position. Thus, during an article delivery operation to the second robot 22b, the travel belts 106 need not be stopped, and the delivery and convey operations of the buffer mechanism 4 can be parallelly executed. As a result, articles can be smoothly transferred from the first robot 22a to the second robot 22b through the buffer mechanism 4.

The automatic assembly system of the present invention has the buffer mechanism 4 which is arranged between the first and second robots 22a and 22b and comprises the convey device for transferring a plurality of articles from the first robot 22a to the second robot 22b. The buffer mechanism 4 comprises the reception lifter 108 which is operated on the basis of an operation end signal from the first robot 22a. The reception lifter 108 moves an article from the reception position to the convey position by the convey device, thereby transferring the article from the first robot 22a to the buffer mechanism 4. As a result, when trays present on the mounting guide 68a on the first robot 22a are to be transferred to the tray reception position of the buffer mechanism 4, the transfer operation can be executed without interrupting the pair of travel belts 106. Furthermore, after the tray is received by the reception lifter 108, the received tray can be conveyed to the tray delivery position of the convey device by continuous operations. In this manner, the reception and delivery operations of trays can be smoothly executed.

Figure 15A:
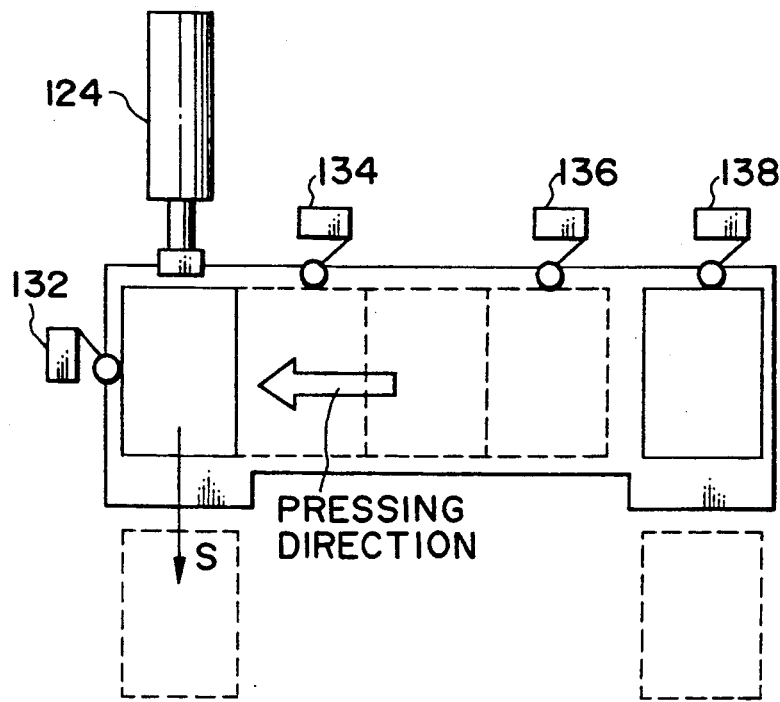
FIG. 15A is a plan view for explaining problems in a convey state when trays are conveyed in a multiple collision state in the buffer mechanism.

In the embodiment described above, if the tray $T_b$ at the delivery position and the tray $T_1$ at the first standby position are assumed to be conveyed in a so-called multiple collision state, a right side surface $T_{b-1}$ (FIG. 15A) of the tray $T_b$ and a left side surface $T_{1-1}$ (FIG. 15A) are in contact with each other, as shown in FIG. 15A. As a result, a contact pressure by a convey force of the travel belts 106 always acts on the tray $T_b$ at the delivery position from the right-hand side. The contact pressure is kept applied as long as the trays $T_b$ and $T_1$ are in contact with each other even when the tray $T_b$ at the delivery position is set in a delivery operation state wherein it is moved upward from the convey surfaces of the travel belts 106 by the delivery lifter 112.

If the above-mentioned contact pressure is applied to the tray $T_b$ at the delivery position, the transfer position of the tray $T_b$ to be transferred is undesirably varied when the delivery pusher 122 transfers the tray $T_b$ in the direction of the arrow S.

In particular, when an article placed on a tray is conveyed, if the tray is transferred to the second robot 22b while the transfer position of the tray is changed, an erroneous operation occurs during a pickup operation by a robot hand for an assembly/machining operation by the second robot 22b.

For this reason, in the embodiment described above, the tray $T_b$ at the delivery position on the convey device is kept separated from the tray $T_1$ at the first standby position, thus solving the above-mentioned problem.

Figure 15B:
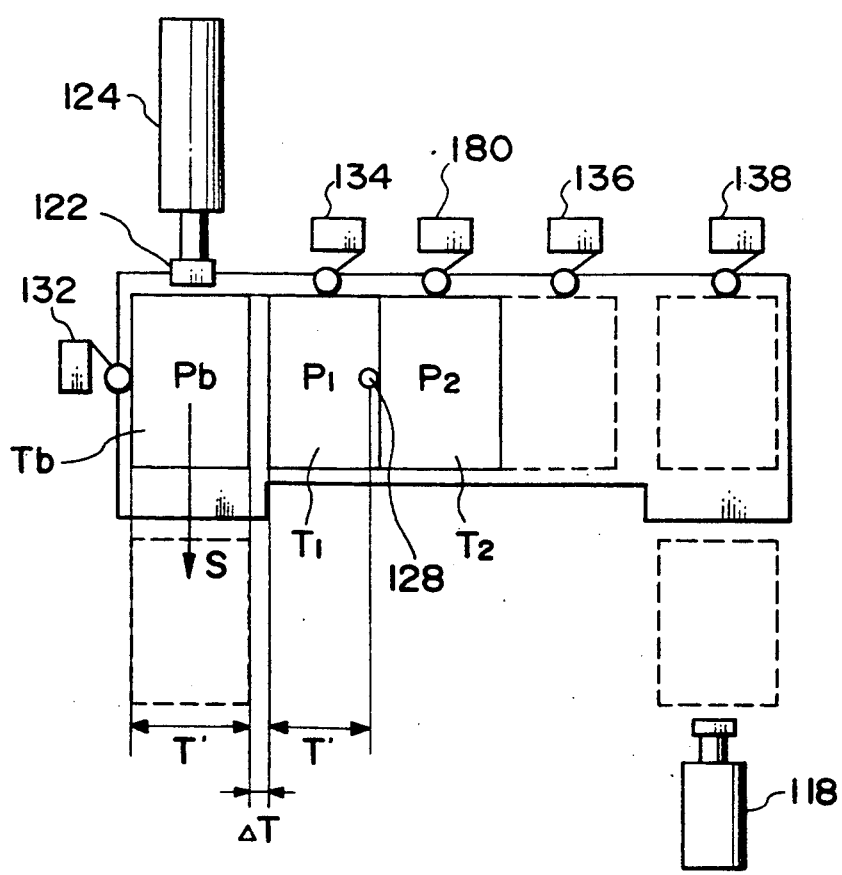
FIG. 15B is a plan view showing a technique employed in one embodiment to solve the problem shown in FIG. 15A.

In order to solve the above problem, in the above embodiment, as shown in FIGS. 12 and 15B, the position of the stopper member 128 is specially defined.

In FIG. 15B, reference symbol $P_b$ denotes a delivery position; $P_1$, a first standby position; and $P_2$, a second standby position adjacent to the first standby position. Reference numeral 180 denotes a second standby position sensor for outputting an ON signal when a tray T is transferred to the second standby position $P_2$.

The head portion of the stopper member 128 is located at a position where a distance (interval) $\Delta T$ can be set between the tray $T_b$ at the delivery position $P_b$ and the tray $T_1$ at the first standby position $P_1$.

A description will be started from a state wherein the tray $T_2$ is conveyed to the second standby position $P_2$.

The tray $T_b$ at the delivery position $P_b$ is transferred in the direction of the arrow S upon operations of the delivery lifter 112 and the delivery pusher 124. When there is no tray $T_b$ at the delivery position $P_b$, the stopper member 128 is released, and the tray $T_1$ at the first standby position $P_1$ is conveyed to the delivery position $P_b$. When the tray $T_b$ at the delivery position $P_b$ is transferred, the delivery tray sensor 132 is turned off, and the fourth counter $C_1$ starts the counting operation in response to an inverted signal of an OFF signal from the sensor 132. After the lapse of a predetermined period of time, the stopper cylinder 130 is operated in response to a counter output. In this manner, the tray $T_2$ located at the second standby position $P_2$ so far by the stopper member 128 is conveyed to the first standby position $P_1$ and is locked at this position. The tray $T_2$ conveyed to the first stopper position $P_1$ and the tray $T_1$ conveyed to the delivery position $P_b$ can keep an interval of $\Delta T$ by the stopper member 128, as shown in FIG. 15B.

As described above, when the position of the stopper member 128 is specially defined, the multiple collision convey state of trays can be reliably prevented. As a result, an erroneous operation during a pickup operation of the robot hand caused by an unstable convey position of a tray can be reliably eliminated.

The present invention is not limited to the arrangement of the above embodiment, and various changes and modifications may be made within the spirit and scope of the invention.

The second embodiment of the present invention will be described below with reference to FIGS. 16 and 17. In the following description, the same reference numerals denote the same parts as in the above embodiment, and a detailed description thereof will be omitted.

In the upper half of FIG. 16, a first robot $22_3$ picks up respective parts from a plurality of tape cassettes of a second supply mechanism 6a, also picks up respective parts from a plurality of pallets of a first supply mechanism 8a, and is moved by its assembly movement stroke $l_1$ along a shuttle base (rail) 12.

In the parts assembly process by the first robot $22_3$, if the assembly movement stroke of the second parts supply mechanism 6a is decreased upon modification of a product obtained by assembling parts or a unit and that of the first robot $22_3$ becomes $l_2$, a necessary movement stroke of the first robot $22_3$ is decreased by $l_1-l_2=l_3$.

Note that assembly movement strokes $l_4$ and $l_5$ of a second robot $22_4$ are also determined by the number of parts to be supplied and alignment intervals of the supply mechanisms as in the assembly movement strokes $l_1$ and $l_2$ of the first robot $22_3$.

The second embodiment is to provide a parts supply method which can cope with an assembly mode of changing a movement stroke of the robot $22_3$ of the first assembly unit According to the second embodiment, in order to cope with a change in assembly movement stroke of a robot in the first assembly unit described above, in an assembly or machining apparatus having a buffer mechanism which is arranged between assembly movement stroke paths of the first and second robots $22_3$ and $22_4$, and comprises a convey means for receiving trays on which parts are placed from the first robot $22_3$ and delivering them to the second robot $22_4$, the buffer mechanism is movable in accordance with the movement strokes of the first and second robots $22_3$ and $22_4$ during assembly or machining of parts, thereby solving the above-mentioned problem.

Figure 17:
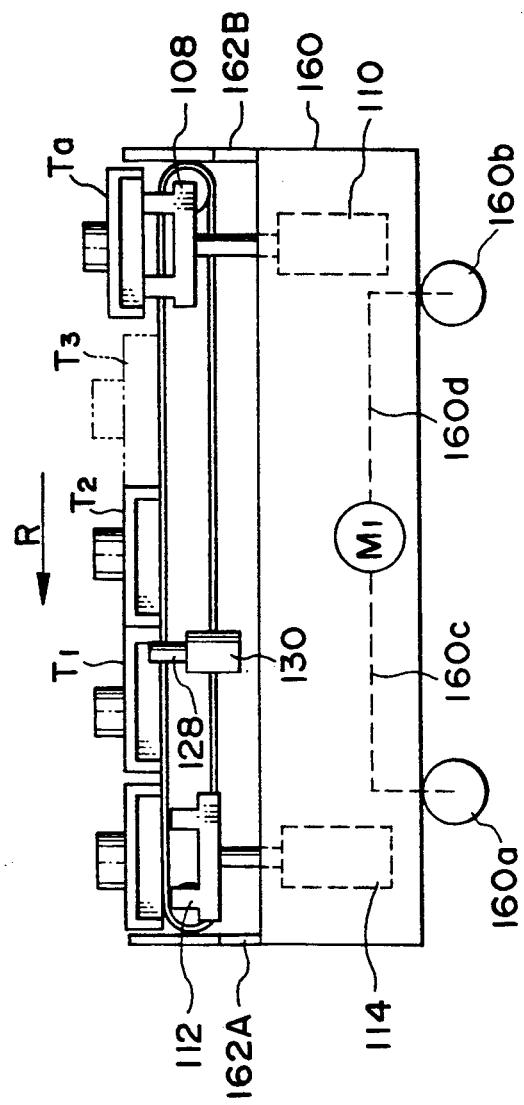
FIG. 17 is a front view showing the arrangement of a moving mechanism of the buffer mechanism in the second embodiment.

FIG. 17 shows the arrangement of the buffer mechanism according to the second embodiment.

In FIG. 17, reference numeral 160 denotes a car unit as a moving mechanism of the buffer mechanism 4. The car unit 160 comprises wheels 160a and 160b for moving the buffer mechanism itself, a motor $M_1$ disposed in the car unit 160, and driving force transmission mechanisms 160c and 160d for transmitting the driving force of the motor to the wheels 160a and 160b. The driving force transmission mechanisms 160c and 160d comprise driving force transmission chains in the second embodiment.

A first lift cylinder 110 for driving a reception lifter 108 and a second lift cylinder 114 for driving a delivery lifter 112 are housed and held in the car unit 160. The buffer mechanism $4_2$ is supported and placed on the car unit 160 as a whole through support members 162A and 162B.

As has been described above with reference to the upper half of FIG. 16, upon modification of an assembly or machining mode of the first assembly unit, the position of the modified buffer mechanism $4_2$ must often be moved, as shown in the lower half of FIG. 16.

When the buffer mechanism must be moved in this manner, according to this embodiment, as shown in FIG. 17, the wheels 160a and 160b are driven by the motor $M_1$ incorporated in the car unit 160. In this manner, the position of the buffer mechanism $4_2$ can be changed from the position shown in the upper half of FIG. 16 to the position shown in the lower half of FIG. 16.

In this manner, in the second embodiment, since the buffer mechanism 4 is placed on the car unit 160 as the moving mechanism, the buffer mechanism 4 and the second robot side can be moved in a direction of an arrow in the lower half of FIG. 16. Upon movement of the buffer mechanism 4, the assembly process by the first robot $22_3$ and the assembly (machining) process by the second robot $22_4$ can be continuously performed through the buffer mechanism 4.

The robots $22_3$ and $22_4$ can be used with optimal movement strokes, and a task loss in robot operations caused by wasteful movement can be eliminated.

The third embodiment of the present invention will be described below with reference to FIGS. 18A to 18E and FIG. 19.

The third embodiment employs buffer convey speed control for conveying a first tray finished with an operation in a first assembly unit to a second assembly unit as quick as possible, and then performing a constant-speed convey operation in an initial state wherein no tray is placed on a pair of travel belts of a convey device of a buffer mechanism 4.

Figure 18A:
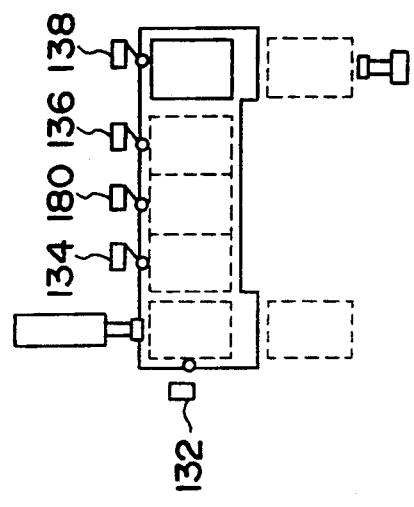
FIGS. 18A to 18E are plan views sequentially showing convey states at variable tray convey speeds according to the third embodiment of an automatic assembly system of the present invention.

In FIG. 18A, as in the second embodiment, reference symbol $P_b$ denotes a delivery position; $P_1$ and $P_2$, first and second standby positions, respectively: $P_3$, a third standby position; and $P_a$, a reception position. Reference numeral 138 denotes a reception sensor for, when a tray is transferred to the reception position $P_a$, outputting an ON signal.

Reference numeral 132 denotes a delivery sensor for, when a tray is conveyed to the delivery position $P_b$, outputting an ON signal; 134, 180, and 136, first, second, and third standby tray sensors for, when trays are respectively conveyed to the first, second, and third standby positions, outputting ON signals.

Figure 18B:
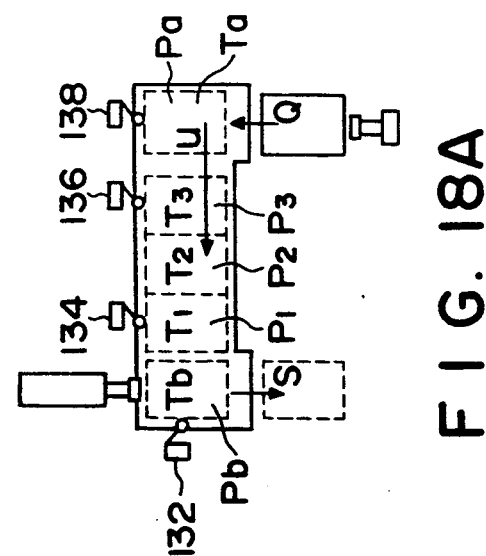
Figure 18E:
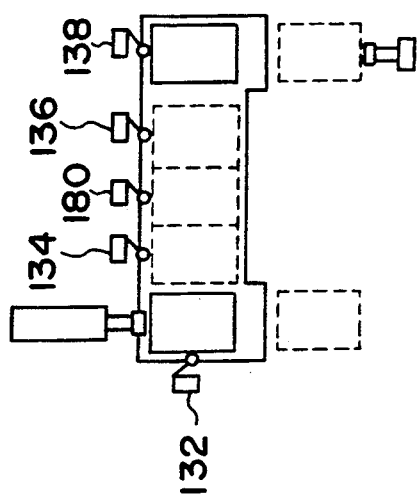
Figure 18D:
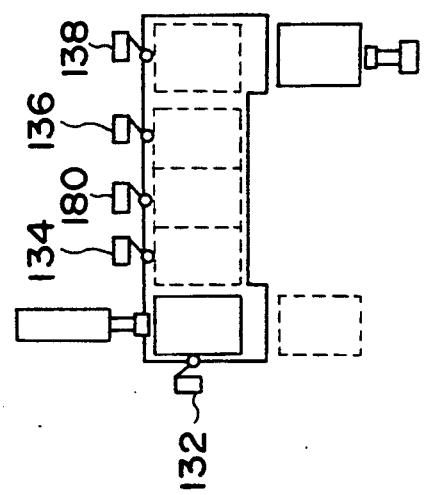
Figure 18C:
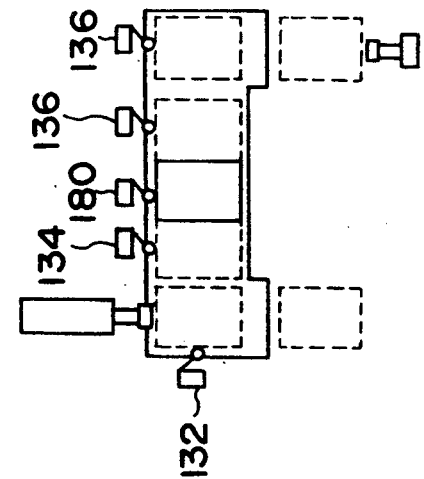

FIG. 18A illustrates an initial state wherein no tray is present in the buffer mechanism 4. FIG. 18B illustrates a state wherein a tray is transferred to the reception position $P_a$. FIG. 18C illustrates a transient state wherein a tray is being transferred from the reception position $P_a$ to the delivery position $P_b$. FIG. 18D illustrates a state wherein a tray is located at the delivery position $P_b$. FIG. 18E illustrates a state wherein the next tray is transferred to the reception position $P_a$ while the previous tray is present at the delivery position $P_b$.

In the characteristic feature of the third embodiment, the convey speed of a tray is increased during a period from the state in FIG. 18B to a state in FIG. 18D, and the convey speed of a tray is decreased in other periods. More specifically, the convey speed is increased from the time when a tray is transferred to the reception position $P_a$, the reception sensor 138 is turned on, there are no trays at other positions in the buffer mechanism 4, and all the delivery tray sensor 132, the first, second, and third standby sensors are OFF to the time when the tray at the reception position $P_a$ is transferred to and reaches the delivery position $P_b$, and the delivery tray sensor 132 generates an ON signal.

Figure 19:
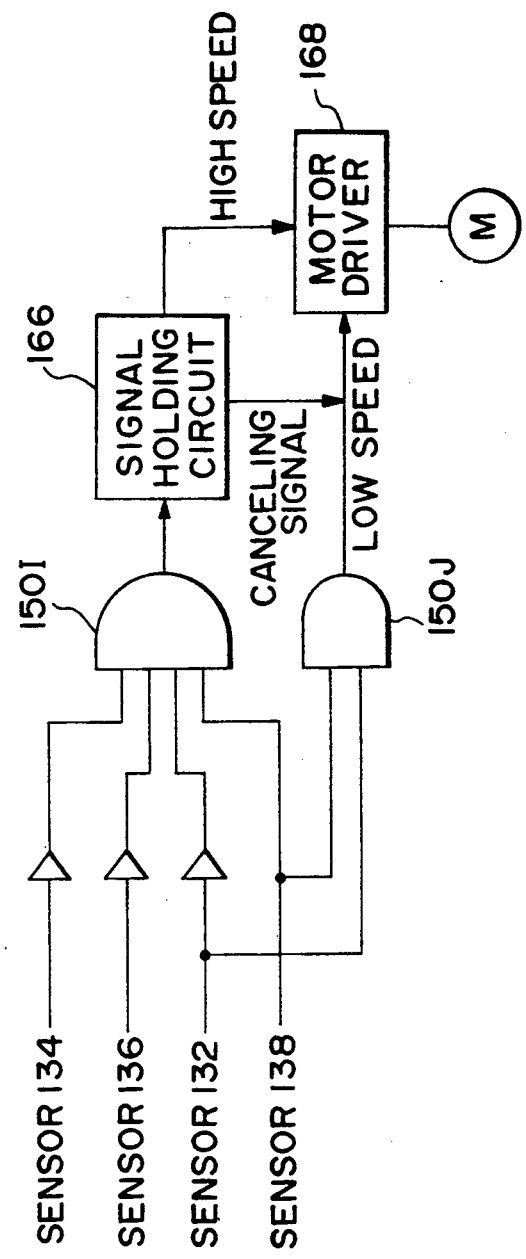
FIG. 19 is a block diagram showing the arrangement of a control mechanism which can variably change a tray convey speed in the third embodiment.

FIG. 19 is a block diagram for speed-controlling a motor M for driving travel belts 106 on the basis of signals from the sensors shown in FIG. 18A.

This block diagram illustrates a ninth logic circuit 150I for receiving signals from the sensors 132, 134, 136, and 138, a signal holding circuit 166 for outputting to a driver 168 a signal for rotating the motor M at high speed within a predetermined period of time in response to a signal from the logic circuit 150I, and the like.

The operations of the control blocks in FIG. 19 will be described based upon operations shown in FIGS. 18A to 18E.

In the initial state shown in FIG. 18A, no trays are present on the travel belts 106.

As shown in FIG. 18B, when a first tray is placed on a reception lifter 108, a signal of the reception sensor 138 is enabled, and the sensors 132, 134, and 136 are kept off.

The ninth logic circuit 150I receives inverted signals of signals from these sensors 132, 134, and 136, and the ON signal from the reception sensor 138, and causing the signal holding circuit 166 to output a signal for rotating the motor M at high speed.

The tray transferred onto the reception lifter 108 is conveyed to the delivery position $P_b$ by the travel belts 106. While the tray is being conveyed from the reception position $P_a$ to the delivery position $P_b$, the sensors 136 and 134 are turned off, on, and off by the tray. In this case, the motor M is rotated at high speed by the signal holding circuit 166.

As shown in FIG. 18E, when the first tray reaches the delivery position $P_b$ to turn on the sensor 132, and the second tray is transferred onto the reception lifter 108 to turn on the reception sensor 138, signals from the sensors 132 and 138 are input to a tenth logic circuit 150J.

The tenth logic circuit 150J outputs a canceling signal to the signal holding circuit 166 to stop output of a high-speed rotation signal of the motor, and also outputs to the driver 168 a signal for rotating the motor M at low speed. Thus, the convey speed of the travel belts 106 is switched from a high convey speed to a low convey speed.

As described above, in the third embodiment, the buffer mechanism for holding a tray on which an article is placed is arranged between first and second assembly or machining stations. Only when a tray is present at a reception position from the first robot, a convey speed from the reception position from the first robot to the delivery position for the second robot is increased, and otherwise, the convey speed is decreased. In this manner, according to the third embodiment, the following effects can be obtained while a stop rate of the second robot caused by the fact that no tray is transferred from the first robot to the second robot remains the same.

(1) Noise produced by belts and belt drive systems can be reduced.

(2) When trays stay, a degree of frictional contacts between belts and trays can be decreased, and the service life of each tray can be prolonged.

(3) Dust caused by frictional contact between belts and belt driving systems, between belts and trays, between belts and a conveyor structure, and the like can be minimized, and the present invention can be applied to operations requiring cleanness.

As many apparently widely different embodiments of the present invention can be made without departing from the spirit and scope thereof, it is to be understood that the invention is not limited to the specific embodiments thereof except as defined in the appended claims.

What is claimed is:

1. A method of accessing and assembling articles in an assembly apparatus including a shuttle carrying a robot, an assembly jig, and a camera, with the shuttle travelling along a shuttle base having a track, replaceable first article suppliers located on one side of the shuttle base for supplying first articles, replaceable second article suppliers located on the other side of the shuttle base for supplying second articles, and a controller for controlling the apparatus, said method comprising the steps of:

aligning the first articles on the first article suppliers;

securing the second articles on a strip of tape located on the second article suppliers;

photographing the first and second articles with the camera to obtain image information;

traversing the robot along the track to pick up the first and second articles based on the image information obtained in the photographing step; and assembling a predetermined assembly using the picked up first and second articles.

2. A method of accessing and assembling parts in an assembly apparatus including a shuttle carrying a robot and an assembly jig and travelling along a shuttle base having a track, a plurality of parts supply sources aligned along the track on at least one side of the shuttle base, a controller for controlling the apparatus, and a checking system attached to the shuttle for checking the alignment state of the parts, said method comprising the steps of:

traversing the shuttle along the track so that the robot sequentially accesses a plurality of parts disposed in a parts supply box in each parts supply source;

checking an image of the parts in the parts supply box in a next aligned parts supply source to determine the alignment state of each part;

storing the alignment state of each part to be picked up by the robot in the next pick up operation;

controlling the robot to pick up a part whose alignment state was previously determined; and assembling a predetermined assembly with the accessed parts.

* * * * *

UNITED STATES PATENT AND TRADEMARK OFFICE
CERTIFICATE OF CORRECTION

PATENT NO. : 5,125,149

DATED : June 30, 1992

INVENTOR(S) : Ryohei Inaba, et al.

It is certified that error appears in the above-identified patent and that said Letters Patent is hereby corrected as shown below:

ON THE TITLE PAGE,

[30] FOREIGN APPLICATION PRIORITY DATA:

```
Insert --April 4, 1990   [JP]   Japan .............. 2-89608
         April 5, 1990   [JP]   Japan .............. 2-91454
         April 9, 1990   [JP]   Japan .............. 2-94385
         April 9, 1990   [JP]   Japan .............. 2-94386--.
```

In the Drawings, Sheet 15:

Figure 13B, "SILINDER" should read --CYLINDER-- (both occurrences).

Column 8:

Line 4, "of (in front" should read --(in front) of--.

Column 9:

Line 6, "44" should read --14--.

Column 12:

Line 13, "tape 22." should read --tape 72.--.
Line 67, "mechanism 92g." should read --mechanism 92a--.
Line 68, "mechanism 92" should read --mechanism 92a--.

UNITED STATES PATENT AND TRADEMARK OFFICE
CERTIFICATE OF CORRECTION

PATENT NO. : 5,125,149

DATED : June 30, 1992

INVENTOR(S) : Ryohei Inaba, et al.

It is certified that error appears in the above-identified patent and that said Letters Patent is hereby corrected as shown below:

COLUMN 13:

Line 17, "92g" should read --92a--.

COLUMN 26:

Line 4, "counter C3" should read --counter $C_3$--.

COLUMN 28:

Line 9, "pusher 124." should read --pusher 122.--.
Line 23, "stopper" should read --standby--.

Signed and Sealed this

Twelfth Day of October, 1993

Attest:

BRUCE LEHMAN

Attesting Officer     Commissioner of Patents and Trademarks